(12) United States Patent
Oketani

(10) Patent No.: US 10,374,748 B2
(45) Date of Patent: Aug. 6, 2019

(54) DEVICE AND METHOD FOR HARQ ACK/NACK BITS TRANSMISSION

(71) Applicant: NEC CORPORATION, Tokyo (JP)

(72) Inventor: Kengo Oketani, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/571,200

(22) PCT Filed: Feb. 25, 2016

(86) PCT No.: PCT/JP2016/001016
§ 371 (c)(1),
(2) Date: Nov. 1, 2017

(87) PCT Pub. No.: WO2016/185641
PCT Pub. Date: Nov. 24, 2016

(65) Prior Publication Data
US 2018/0262295 A1    Sep. 13, 2018

(30) Foreign Application Priority Data

May 15, 2015 (JP) ................................ 2015-099772

(51) Int. Cl.
*H04L 1/00* (2006.01)
*H04L 1/18* (2006.01)
(Continued)

(52) U.S. Cl.
CPC .......... *H04L 1/0002* (2013.01); *H04L 1/0068* (2013.01); *H04L 1/1812* (2013.01);
(Continued)

(58) Field of Classification Search
CPC ..... H04L 1/1861; H04L 5/001; H04L 5/0007; H04L 1/0026; H04L 1/0073;
(Continued)

(56) References Cited

U.S. PATENT DOCUMENTS

| 2011/0064164 A1* | 3/2011 | Seo .................... H04L 1/1607 375/316 |
| 2011/0116530 A1* | 5/2011 | Sambhwani .......... H04L 1/1607 375/145 |

(Continued)

FOREIGN PATENT DOCUMENTS

| JP | 2014-78998 A | 5/2014 |
| JP | 2015-14909 A1 | 1/2015 |

(Continued)

OTHER PUBLICATIONS

Potevio, "UL control channel enhancement for carrier aggregation beyond 5 carriers", 3GPP TSG RAN WG1 Meeting #80bis , 5 pages.

(Continued)

*Primary Examiner* — Khanh C Tran
(74) *Attorney, Agent, or Firm* — Sughrue Mion, PLLC

(57) ABSTRACT

A wireless terminal (1) is configured, when a plurality of hybrid automatic repeat request (HARQ) ACK/NACK bits corresponding to a plurality of downlink component carriers (DL CCs) configured in the wireless terminal (1) are transmitted on a single physical uplink control channel (PUCCH) on a single uplink component carrier (UL CC), to change a spreading rate to be applied to time-domain spreading of a plurality of modulation symbols generated from the plurality of HARQ ACK/NACK bits, depending on the number of the plurality of DL CCs or the number of the plurality of HARQ ACK/NACK bits.

20 Claims, 22 Drawing Sheets

(51) Int. Cl.
| | |
|---|---|
| *H04L 5/00* | (2006.01) |
| *H04L 25/03* | (2006.01) |
| *H01L 27/26* | (2006.01) |
| *H04W 28/04* | (2009.01) |
| *H04W 28/06* | (2009.01) |
| *H04W 72/04* | (2009.01) |
| *H04L 27/26* | (2006.01) |

(52) U.S. Cl.
CPC .......... *H04L 1/1861* (2013.01); *H04L 5/0016* (2013.01); *H04L 5/0055* (2013.01); *H04L 25/03866* (2013.01); *H04L 27/2602* (2013.01); *H04W 28/04* (2013.01); *H04W 28/065* (2013.01); *H04W 72/04* (2013.01); *H04W 72/0413* (2013.01)

(58) Field of Classification Search
CPC ... H04L 5/0055; H04L 1/0031; H04L 5/0053; H04L 5/0073; H04L 1/0007; H04W 72/0413; H04W 88/02; H04W 72/04; H04W 72/042
See application file for complete search history.

(56) References Cited

U.S. PATENT DOCUMENTS

| | | | |
|---|---|---|---|
| 2011/0243066 A1* | 10/2011 | Nayeb Nazar | H04L 1/007 370/328 |
| 2012/0155337 A1* | 6/2012 | Park | H04L 1/1692 370/280 |
| 2013/0064210 A1 | 3/2013 | Nakao | |
| 2013/0114501 A1 | 5/2013 | Kishiyama et al. | |
| 2013/0195066 A1 | 8/2013 | Lee et al. | |
| 2014/0044083 A1* | 2/2014 | Kim | H04L 5/001 370/329 |
| 2014/0376424 A1 | 12/2014 | Seo et al. | |
| 2015/0103786 A1 | 4/2015 | Nakao | |
| 2017/0135092 A1 | 5/2017 | Seo et al. | |
| 2018/0167934 A1 | 6/2018 | Seo et al. | |

FOREIGN PATENT DOCUMENTS

| | | |
|---|---|---|
| JP | 2015-512174 A | 4/2015 |
| WO | 2011/145284 A1 | 11/2011 |

OTHER PUBLICATIONS

3GPP TS 36.211 V12.5.0 (Mar. 2015), "3rd Generation Partnership Project; Technical Specification Group Radio Access Network; Evolved Universal Terrestrial Radio Access (E-UTRA); Physical channels and modulation (Release 12)," Mar. 2015,136 pages.
International Search Report for PCT/JP2016/001016 dated Apr. 19, 2016.
Catt, "New PUCCH format(s) for up to 32 CCs", 3GPP TSG RAN WG1 Meeting #80bis, R1-151348, Apr. 20-24, 2015, 4 pages.
Catt, "HARQ-ACK transmission on PUCCH for Rel-13 CA", 3GPP TSG RAN WG1 Meeting #80, R1-150105, Feb. 9-13, 2015, 4 pages.
Communication dated Oct. 2, 2018 issued by the Japanese Patent Office in counterpart application No. 2017-518726.
Communication dated Dec. 3, 2018 from the European Patent Office in counterpart application No. 16796038.4.
Samsung, "PUCCH Power Control for DL CA", R1-105367, PUCCH TPC, 3GPP TSG RAN WG1 #62bis, Mobile Competence Centre, 2010, XP050450516 (3 pages).
Samsung, "DFT-S-OFDM Structure for HARQ-ACK Transmission", 3GPP TSG RAN WG1 #62, R1- 104575, pp. 1-6 (6 pages total), Madrid, Spain, Aug. 23-28, 2010.
Qualcomm Europe, "SRS Multiplexing Structure", 3GPP TSG RAN1 #51-bis, R1-080467, pp. 1-10 (10 total pages) Sevilla, Spain, Jan. 14-18, 2008.
Communication of Reasons of Refusal dated Apr. 9, 2019, from the Japanese Patent Office in counterpart Application No. 2017-518726.

* cited by examiner

```
DeltaShortFormat-OffsetListPUCCH-r13 ::= SEQUENCE {
    DeltaShortFormat-OffsetPUCCH-Format4-r13    ENUMERATED {dB0, dB1, dB2, dB3},
}
```

Fig. 16

```
DeltaShortFormat-OffsetListPUCCH-r13 ::=   SEQUENCE {
    DeltaShortFormat-OffsetPUCCH-Format1-r10        ENUMERATED {dB0, dB1, dB2, dB3},
    DeltaShortFormat-OffsetPUCCH-Format1a1b-r10     ENUMERATED {dB0, dB1, dB2, dB3},
    DeltaShortFormat-OffsetPUCCH-Format1bCS-r11     ENUMERATED {dB0, dB1, dB2, dB3},
    DeltaShortFormat-OffsetPUCCH-Format22a2b-r10    ENUMERATED {dB0, dB1, dB2, dB3},
    DeltaShortFormat-OffsetPUCCH-Format3-r10        ENUMERATED {dB0, dB1, dB2, dB3},
    DeltaShortFormat-OffsetPUCCH-Format4-r13        ENUMERATED {dB0, dB1, dB2, dB3},
}
```

Fig. 17

```
UplinkPowerControlCommon-v13xy ::= SEQUENCE {
    deltaF-PUCCH-Format4-SF1-r13    ENUMERATED {deltaF1, deltaF2, deltaF3, deltaF4,
                                                deltaF5, deltaF6, deltaF7, deltaF8},
    deltaF-PUCCH-Format4-SF2-r13    ENUMERATED {deltaF0, deltaF1, deltaF2, deltaF3,
                                                deltaF4, deltaF5, deltaF6, deltaF7},
    deltaF-PUCCH-Format4-SF4-r13    ENUMERATED {deltaF-1, deltaF0, deltaF1, deltaF2,
                                                deltaF3, deltaF4, deltaF5, deltaF6},
}
```

DEVICE AND METHOD FOR HARQ ACK/NACK BITS TRANSMISSION

CROSS REFERENCE TO RELATED APPLICATIONS

This application is a National Stage of International Application No. PCT/JP2016/001016 filed Feb. 25, 2016, claiming priority based on Japanese Patent Application No. 2015-099772 filed May 15, 2015, the contents of all of which are incorporated herein by reference in their entirety.

TECHNICAL FIELD

The present disclosure relates to wireless communication and, in particular, to a physical uplink control channel (PUCCH) format for transmitting hybrid automatic repeat request (HARQ) ACK/NACK bits from a wireless terminal to a base station.

BACKGROUND ART

Hereinafter, radio frame structures, time-frequency resources (radio resources), and HARQ ACK/NACK transmission used in 3rd Generation Partnership Project (3GPP) Release 8 (referred to as Long Term Evolution (LTE)) and subsequent releases will be described. In addition, carrier aggregation (CA) introduced in 3GPP Release 10 (referred to as LTE-Advanced) and HARQ ACK/NACK transmission in CA will be described.

FIG. 1 illustrates a radio frame structure in LTE and LTE-Advanced. In 3rd Generation Partnership Project (3GPP) Release 8 and subsequent releases, two types of radio frame structures are specified. One is referred to as frame structure type 1 and can be applied to frequency division duplex (FDD). The other is referred to as frame structure type 2 and can be applied to time division duplex (TDD). As illustrated in FIG. 1, in both frame structure type 1 and frame structure type 2, the duration of one radio frame is 10 ms, and one radio frame consists of 10 subframes. The duration of one subframe is 1 ms. Furthermore, one subframe is divided into two slots of 0.5 ms each.

FIG. 2A illustrates details of downlink time-frequency resources in LTE and LTE-Advanced. One downlink slot (0.5 ms) includes $N^{DL}_{SYMB}$ orthogonal frequency-division multiplexing (OFDM) symbols in the time domain. A radio resource defined by one OFDM symbol in the time domain and one subcarrier in the frequency domain is referred to as a "resource element." A resource element is the minimum unit of radio resources in the downlink of LTE and LTE-Advanced using ODFM. A resource unit defined by $N^{DL}_{SYMB}$ consecutive OFDM symbols in the time domain and $N^{RB}_{SC}$ consecutive subcarriers in the frequency domain is referred to as a "resource block." When a normal cyclic prefix is used, the value of $N^{DL}_{SYMB}$ is 7 and the value of $N^{RB}_{SC}$ is 12 and, therefore, one downlink resource block consists of 84 resource elements. The occupied bandwidth (i.e., $N^{DL}_{RB}$ resource blocks or $N^{DL}_{RB} N^{RB}_{SC}$ subcarriers) depends on the downlink system bandwidth (i.e., channel bandwidth ($BW_{Channel}$)). For example, if the system bandwidth is 1.4 MHz, the maximum number of downlink resource blocks ($N^{DL}_{RB}$) is 6, and if the system bandwidth is 20 MHz, the maximum number of downlink resource blocks ($N^{DL}_{RB}$) is 100.

FIG. 2B illustrates details of uplink time-frequency resources in LTE and LTE-Advanced. One uplink slot (0.5 ms) includes $N^{UL}_{SYMB}$ single-carrier frequency-division multiple access (SC-FDMA) symbols in the time domain. SC-FDMA is also referred to as discrete Fourier transform (DFT)-spread OFDM (DFTS-OFDM). Similarly to the downlink, a radio resource defined by one SC-FDMA symbol in the time domain and one subcarrier in the frequency domain is referred to as a "resource element." A resource element is the minimum unit of the radio resources in the uplink of LTE and LTE-Advanced using SC-FDMA. A resource unit defined by $N^{UL}_{SYMB}$ consecutive SC-FDMA symbols in the time domain and $N^{RB}_{SC}$ consecutive subcarriers in the frequency domain is referred to as a "resource block." Similarly to the downlink, when a normal cyclic prefix is used, the value of $N^{UL}_{SYMB}$ is 7 and the value of $N^{RB}_{SC}$ is 12 and, therefore, one uplink resource block consists of 84 resource elements. The occupied bandwidth (i.e., $N^{UL}_{RB}$ resource blocks or $N^{UL}_{RB} N^{RB}_{SC}$ subcarriers) depends on the uplink system bandwidth (i.e., channel bandwidth ($BW_{Channel}$)). For example, if the system bandwidth is 1.4 MHz, the maximum number of uplink resource blocks ($N^{DL}_{RB}$) is 6, and if the system bandwidth is 20 MHz, the maximum number of uplink resource blocks ($N^{UL}_{RB}$) is 100.

In 3GPP Release 8 and subsequent releases, downlink user data is transmitted on a physical downlink shared channel (PDSCH). A wireless terminal (i.e., user equipment (UE)) receives downlink data on a PDSCH, checks whether a cyclic redundancy check (CRC) error is present in the downlink data, and transmits HARQ ACK/NACK bits indicating the result of CRC (i.e., acknowledgement (ACK) or negative ACK (NACK)) on a physical uplink control channel (PUCCH) or a physical uplink shared channel (PUSCH). Specifically, when ULSCH resources are allocated to the UE, HARQ ACK/NACK bits are piggybacked to PDSCH and transmitted. In contrast, when no ULSCH resources are allocated to the UE, HARQ ACK/NACK bits are transmitted on a PUCCH.

In 3GPP Release 8 and Release 9, PUCCH formats 1a and 1b are defined for HARQ ACK/NACK transmission. Basically, the PUCCH format 1a is used to transmit 1-bit HARQ ACK/NACK, and the PUCCH format 1b is used to transmit 2-bit HARQ ACK/NACK. The number of HARQ ACK/NACK bits is determined in accordance with the number of codewords (i.e., 1 or 2) transmitted in the downlink transmission. In other words, the number of HARQ ACK/NACK bits is determined in accordance with whether spatial multiplexing is applied in the downlink transmission. When spatial multiplexing is applied, two codewords (i.e., two transport blocks) are transmitted in a single subframe, and thus the PUCCH format 1b is used.

As illustrated in FIG. 3, the PUCCH is transmitted on the frequency ranges located at both ends of the system bandwidth. The PUCCH transmission in a single subframe is performed by using a single resource block in a first slot (0.5 ms) located at one end of the system bandwidth or in the vicinity thereof and a single resource block in a second slot (0.5 ms) located at the other end of the system bandwidth or in the vicinity thereof. These two resource blocks (RBs) are referred to as an RB pair. As illustrated in FIG. 3, a plurality of RB pairs are used to increase the control signaling capacity. The RB pair (PUCCH region) to be used by the UE can be derived from a PUCCH resource index. The PUCCH resource index is configured in the UE by a base station (i.e., eNodeB (eNB)).

Furthermore, 3GPP Release 10 and subsequent releases define carrier aggregation (CA). In carrier aggregation, a wireless terminal is configured by a base station (eNB) with a plurality of carriers (referred to as component carriers (CCs)) at different frequencies, and can use these component carriers for uplink communication or downlink communication or both. Release 10 specifies carrier aggregation of up to five CCs. The maximum system bandwidth of one CC is 20 MHz, and thus a wireless terminal can use up to 100 MHz in CA of 3GPP Release 10.

To provide a HARQ feedback (ACK/NACK) regarding PDSCH transmission on a plurality of CCs, a new ACK/NACK PUCCH format is defined in Release 10. This new ACK/NACK PUCCH format, which is referred to as a PUCCH format 3, allows HARQ ACK/NACK transmission of up to 20 bits. The PUCCH format 3 is described, for example, in Section 5.4.2A of 3GPP TS 36.211 V12.5.0 (Non Patent Literature 1).

FIG. 4 illustrates a HARQ ACK/NACK transmission scheme using the PUCCH format 3 when a normal cyclic prefix is used. First, in block 401, error-correcting coding and rate matching for the HARQ ACK/NACK bits of a maximum of 20 bits, which have been generated through PDSCH reception, are performed and coded ACK/NACK bits having a length of 48 bits are generated. The coded ACK/NACK bits are scrambled and then mapped to QPSK symbols, and thus 24 QPSK modulation symbols are generated (402). Out of these 24 modulation symbols, 12 modulation symbols (403) are transmitted in the first slot within a subframe, and the remaining 12 modulation symbols (404) are transmitted in the second slot within the subframe. FIG. 4 illustrates a process on the 12 modulation symbols (403) transmitted in the first slot.

Block-wise spreading is performed on these 12 symbols (403). Specifically, the 12 modulation symbols corresponding to one SC-FDMA symbol are spread by the same length-5 spreading code sequence [w(0) w(1) w(2) w(3) w(4)] (404 to 409). This spreading code sequence is also referred to as an orthogonal sequence or an orthogonal cover code (OCC) sequence. The time-domain spreading using the length-5 spreading code sequence provides five sets of 12 modulation symbols. These five sets of 12 modulation symbols are mapped to predetermined five SC-FDMA symbols within the first slot. Each set of 12 modulation symbols is cyclically shifted, DFT-spread, mapped to 12 subcarriers, and converted to a time-domain signal through Inverse Fast Fourier Transform (IFFT), and thus SC-FDMA symbols are generated.

CITATION LIST

Non Patent Literature

Non Patent Literature 1: 3GPP TS 36.211 V12.5.0 (2015-03), "3rd Generation Partnership Project; Technical Specification Group Radio Access Network; Evolved Universal Terrestrial Radio Access (E-UTRA); Physical channels and modulation (Release 12)," March, 2015

SUMMARY OF INVENTION

Technical Problem

In 3GPP Release 13, discussions on a further enhancement of the carrier aggregation functionality have started. Specifically, a mechanism necessary for enabling carrier aggregation of up to 32 component carriers (CCs) is being discussed. If carrier aggregation of 32 component carriers is performed, the number of HARQ ACK/NACK bits for downlink transmission on 32 component carriers exceeds the number of bits that can be transmitted in accordance with the PUCCH format 3 described above.

In the case of FDD, when CA of 32 DL component carriers (CCs) is performed and when a two-codeword transmission mode is used for each DL CC, a UE needs to transmit a total of 64-bit HARQ ACK/NACK in response to the DL reception on the 32 DL CCs. Furthermore, in the case of TDD, the number of HARQ ACK/NACK bits to be transmitted by the UE increases in proportion to the bundling window size. For example, when the situation of TDD is identical to that of the above-described FDD case and when the bundling window size is 2, the UE needs to transmit 128-bit HARQ ACK/NACK. When the bundling window size is 4, the UE needs to transmit 256-bit HARQ ACK/NACK. In a known method for reducing the number of HARQ ACK/NACK bits in TDD, the number of HARQ ACK/NACK bits is compressed to 1 bit per bundling window by a logical AND operation of all the HARQ ACK/NACK bits within the bundling windows. However, even if this method is used, the number of HARQ ACK/NACK bits in TDD can be compressed only up to 64 bits. Therefore, a new PUCCH format in which the number of HARQ ACK/NACK bits that can be transmitted per subframe is greater than that in the exiting PUCCH format 3 is required.

However, increasing the number of HARQ ACK/NACK bits that a UE can transmit per resource block (or per slot) or per subframe may result in an increase in the PUCCH resources (resource blocks) or a decrease in the number of UEs that can be multiplexed on the same PUCCH resource block, or both. For example, the number of UEs (or the number of PUCCH transmissions) that can be multiplexed on the same resource block through time-domain spreading using orthogonal spreading codes may decrease. Meanwhile, in some implementations, not all the UEs support CA of up to 32 CCs, and it is expected that the number of aggregated CCs differs among the UEs. Therefore, it is preferable that a new PUCCH format be able to adjust, depending on the number of component carriers, the number of HARQ ACK/NACK bits that a UE can transmit per unit time (e.g., slot or subframe).

One of the objects to be attained by the embodiments disclosed herein is to provide an apparatus, a method, and a program that contribute to making it possible to adjust, depending on the number of component carriers, the number of HARQ ACK/NACK bits that a UE can transmit per unit time (e.g., slot or subframe). It should be noted that this object is merely one of the objects to be attained by the embodiments disclosed herein. Other objects or problems and novel features will become apparent from the following description and the accompanying drawings.

Solution to Problem

In a first aspect, a wireless terminal includes a wireless transceiver configured to wirelessly communicate with a base station, and at least one processor coupled to the wireless transceiver. The at least one processor is configured, when a plurality of hybrid automatic repeat request (HARQ) ACK/NACK bits corresponding to a plurality of downlink component carriers (DL CCs) configured in the wireless terminal are transmitted on a single Physical Uplink Control Channel (PUCCH) on a single uplink component carrier (UL CC), to change, depending on the number of the plurality of DL CCs or the number of the plurality of HARQ ACK/NACK bits, a spreading rate to be applied to time-domain spreading of a plurality of modulation symbols generated from the plurality of HARQ ACK/NACK bits.

In a second aspect, a method in a wireless terminal includes, when a plurality of hybrid automatic repeat request (HARQ) ACK/NACK bits corresponding to a plurality of downlink component carriers (DL CCs) configured in the wireless terminal are transmitted on a single physical uplink control channel (PUCCH) on a single uplink component carrier (UL CC), changing, depending on the number of the plurality of DL CCs or the number of the plurality of HARQ ACK/NACK bits, a spreading rate to be applied to time-domain spreading of a plurality of modulation symbols generated from the plurality of HARQ ACK/NACK bits.

In a third aspect, a base station includes a wireless transceiver configured to wirelessly communicate with a wireless terminal, and at least one processor coupled to the wireless transceiver. The at least one processor is configured to receive, from the wireless terminal, a physical uplink control channel (PUCCH) transmitted in accordance with a PUCCH format. The PUCCH format enables the wireless terminal, when a plurality of hybrid automatic repeat request (HARQ) ACK/NACK bits corresponding to a plurality of downlink component carriers (DL CCs) configured in the wireless terminal are transmitted on a single physical uplink control channel (PUCCH) on a single uplink component carrier (UL CC), to change a spreading rate to be applied to time-domain spreading of a plurality of modulation symbols generated from the plurality of HARQ ACK/NACK bits, depending on the number of the plurality of DL CCs or the number of the plurality of HARQ ACK/NACK bits.

In a fourth aspect, a method in a base station includes receiving, from a wireless terminal, a physical uplink control channel (PUCCH) transmitted in accordance with a PUCCH format. The PUCCH format enables the wireless terminal, when a plurality of hybrid automatic repeat request (HARQ) ACK/NACK bits corresponding to a plurality of downlink component carriers (a plurality of DL CCs) configured in the wireless terminal are transmitted on a single physical uplink control channel (PUCCH) on a single uplink component carrier (UL CC), to change a spreading rate to be applied to time-domain spreading of a plurality of modulation symbols generated from the plurality of HARQ ACK/NACK bits, depending on the number of the plurality of DL CCs or the number of the plurality of HARQ ACK/NACK bits.

In a fifth aspect, a program includes instructions (software codes) that, when loaded into a computer, causes the computer to perform the method according to the second or fourth aspect described above.

Advantageous Effects of Invention

According to the above aspects, an apparatus, a method, and a program that contribute to making it possible to adjust, depending on the number of component carriers, the number of HARQ ACK/NACK bits that a UE can transmit per unit time (e.g., slot or subframe) can be provided.

BRIEF DESCRIPTION OF THE DRAWINGS

FIG. 16 illustrates an example of an information element used to adjust a PUCCH transmission power.

FIG. 17 illustrates an example of an information element used to adjust a PUCCH transmission power.

FIG. 19 illustrates an example of an information element used to adjust a PUCCH transmission power.

DESCRIPTION OF EMBODIMENTS

Figure 1:
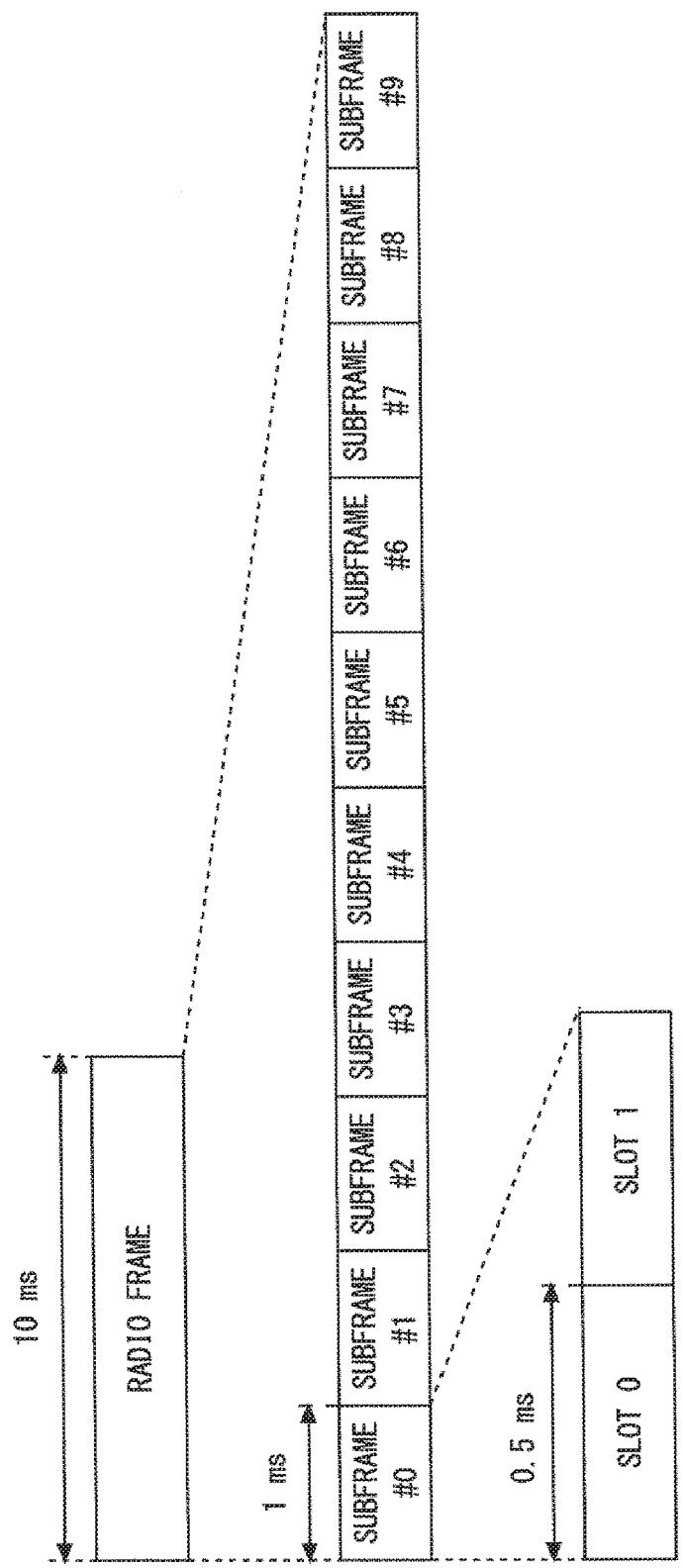
FIG. 1 illustrates a radio frame structure and a subframe structure in LTE.
Figure 2A:
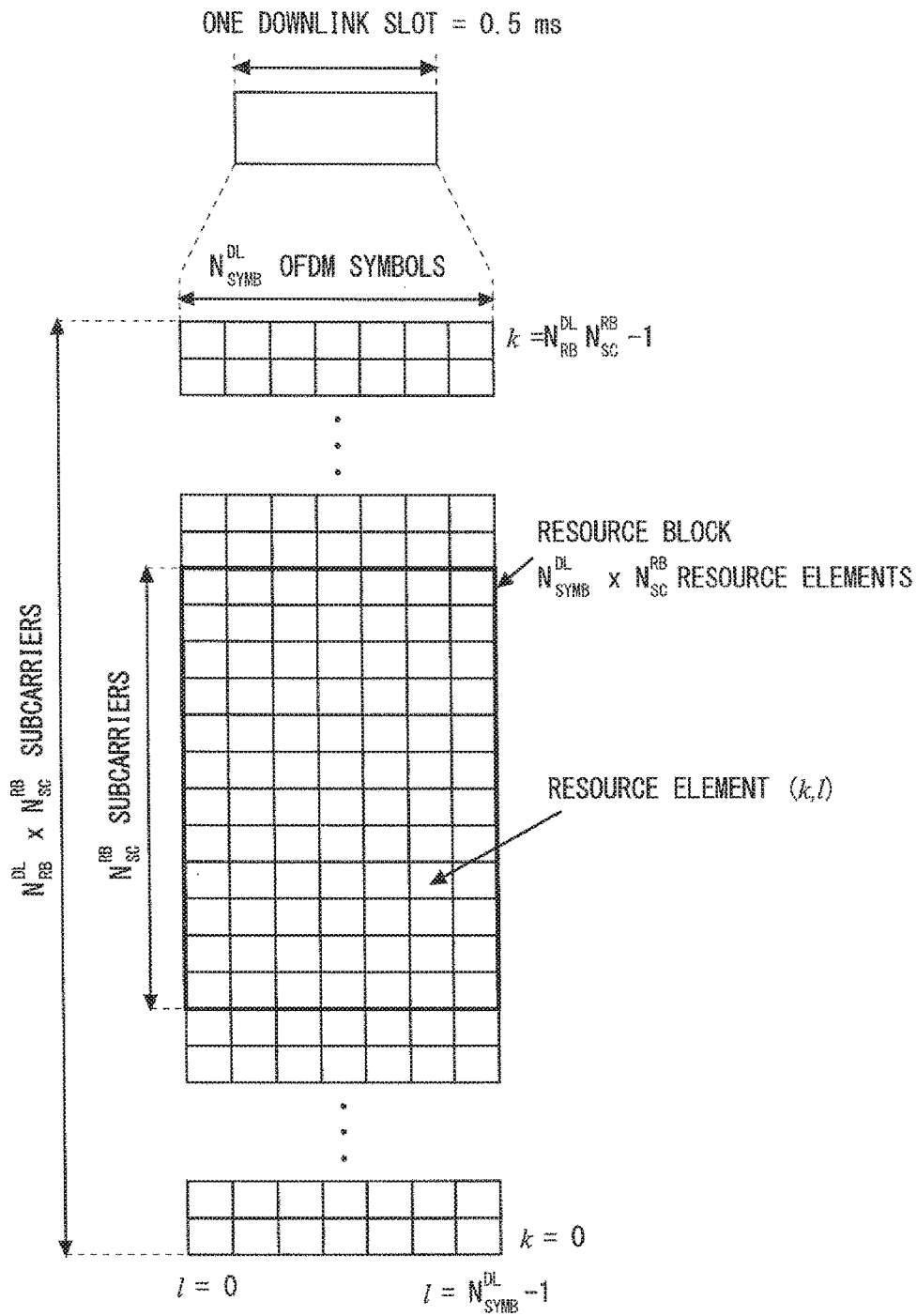
FIG. 2A illustrates a detailed structure of downlink time-frequency resources in LTE.
Figure 2B:
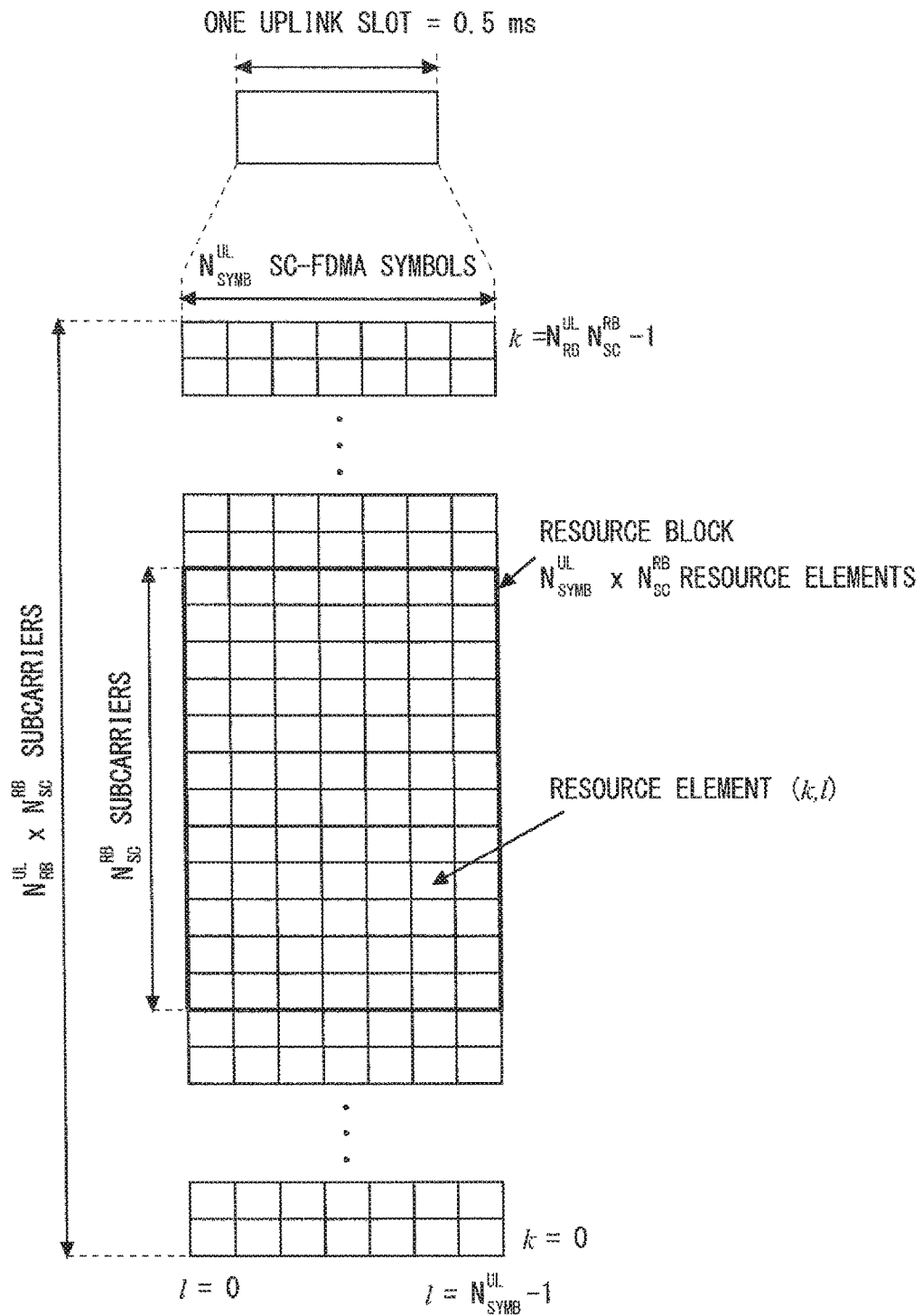
FIG. 2B illustrates a detailed structure of uplink time-frequency resources in LTE.
Figure 3:
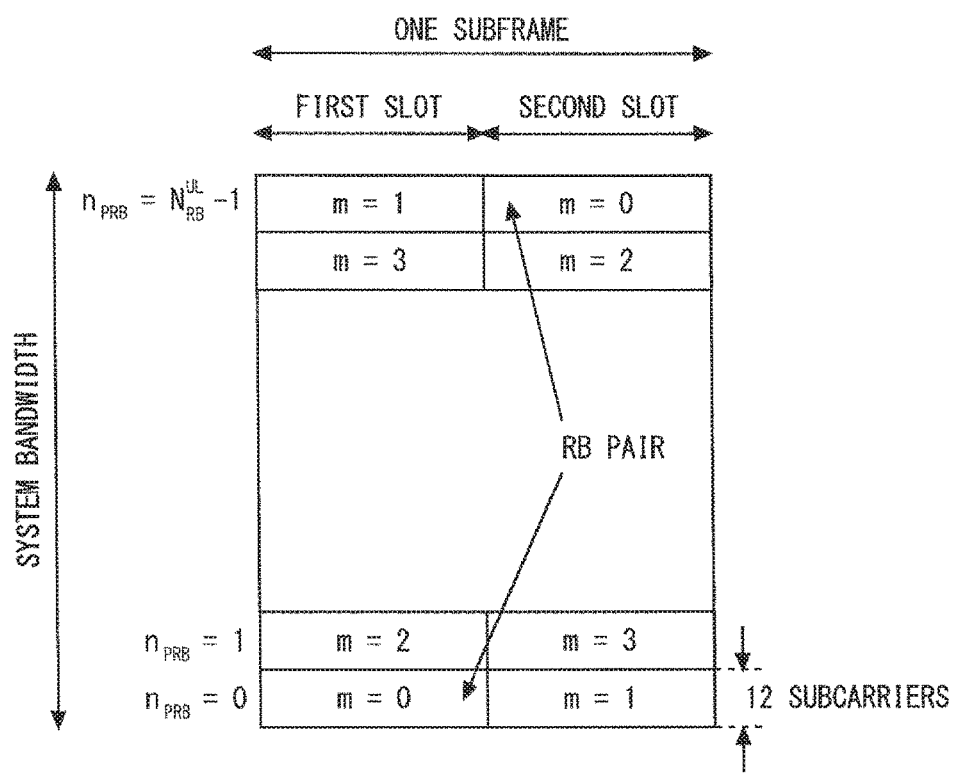
FIG. 3 illustrates an arrangement of PUCCH resource blocks (RBs) in LTE.

Hereinafter, specific embodiments will be described in detail with reference to the drawings. In the drawings, identical or corresponding elements are denoted by the same reference signs, and repeated descriptions will be omitted as necessary for the sake of clarity.

Embodiments described below will be described mainly using specific examples with regard to LTE, LTE-Advanced, and extensions thereof. However, these embodiments may also be applied to other wireless communication systems.

First Embodiment

FIG. 1 illustrates a configuration example of a wireless communication system according to some embodiments including the present embodiment. This wireless communication system provides communication services, such as voice communication or packet data communication or both. In the example illustrated in FIG. 1, the wireless communication system includes a wireless terminal (UE) 1 and a base station (eNB) 2. This embodiment will be described assuming that the wireless communication system is a system of 3GPP Release 8 and subsequent releases. In other words, the wireless terminal 1 corresponds to a UE, and the base station 2 corresponds to an eNB. The UE 1 and the eNB 2 support carrier aggregation of six or more component carriers. The UE 1 receives a DL signal(s) from the eNB on one or more DL component carriers (DL CCs) 501 and transmits a UL signal(s) to the eNB 2 on one or more UL component carriers (UL CCs) 502.

When DL carrier aggregation is performed, the UE 1 transmits HARQ ACK/NACK bits corresponding to a plurality of DL CCs configured in the UE 1 on a single PUCCH on a single UL CC. In addition, the UE 1 is configured to change, depending on the number of DL CCs configured in the UE 1, the spreading rate to be applied to time-domain spreading of a plurality of modulation symbols generated from the HARQ ACK/NACK bits. It is to be noted that the number of HARQ ACK/NACK bits to be transmitted by the UE 1 on a single resource block (a single slot) or a single subframe is determined according to the number of DL CCs configured in the UE 1. Accordingly, the UE 1 may be configured to change the spreading rate to be applied to the time-domain spreading (i.e., block-wise spreading) of ACK/NACK modulation symbols, depending on the number of HARQ ACK/NACK bits to be transmitted on a single PUCCH on a single UL CC.

Specifically, the UE 1 may reduce the spreading rate to be applied to the ACK/NACK modulation symbols as the number of DL CCs configured in the UE 1 increases. In other words, the UE 1 may increase the spreading rate to be applied to the HARQ ACK/NACK modulation symbols as the number of DL CCs configured in the UE 1 decreases. As the spreading rate decreases, the chip rate decreases and the number of ACK/NACK modulation symbols (the number of HARQ ACK/NACK bits) that one UE 1 can transmit per resource block increases, and accordingly the number of HARQ ACK/NACK bits that one UE 1 can transmit on a single resource block increases. In contrast, as the spreading rate increases, the number of ACK/NACK modulation symbols (the number of HARQ ACK/NACK bits) that the UE 1 can transmit per resource block decreases, but the number of UEs that can be multiplexed on the same resource block can be increased.

The eNB 2 is configured to receive a PUCCH transmitted from the UE 1 in accordance with a new PUCCH format. The new PUCCH format enables the UE 1, when HARQ ACK/NACK bits corresponding to a plurality of DL CCs configured in the UE 1 are transmitted on a single PUCCH on a single UL CC, to change the spreading rate applied to the time-domain spreading of modulation symbols generated from the HARQ ACK/NACK bits, depending on the number of the DL CCs or the number of the HARQ ACK/NACK bits.

As can be understood from the above description, when HARQ ACK/NACK bits corresponding to DL CCs configured in the UE 1 are transmitted on a single PUCCH on a single UL CC, the UE 1 changes the spreading rate of the time-domain spreading (i.e., block-wise spreading) of ACK/NACK modulation symbols, depending on the number of the DL CCs or the number of the HARQ ACK/NACK bits. Therefore, the UE 1 can adjust the number of HARQ ACK/NACK bits that the UE 1 can transmit per unit time (e.g., per slot or per subframe), depending on the number of component carriers configured in the UE 1, without changing a PUCCH format.

Figure 6:
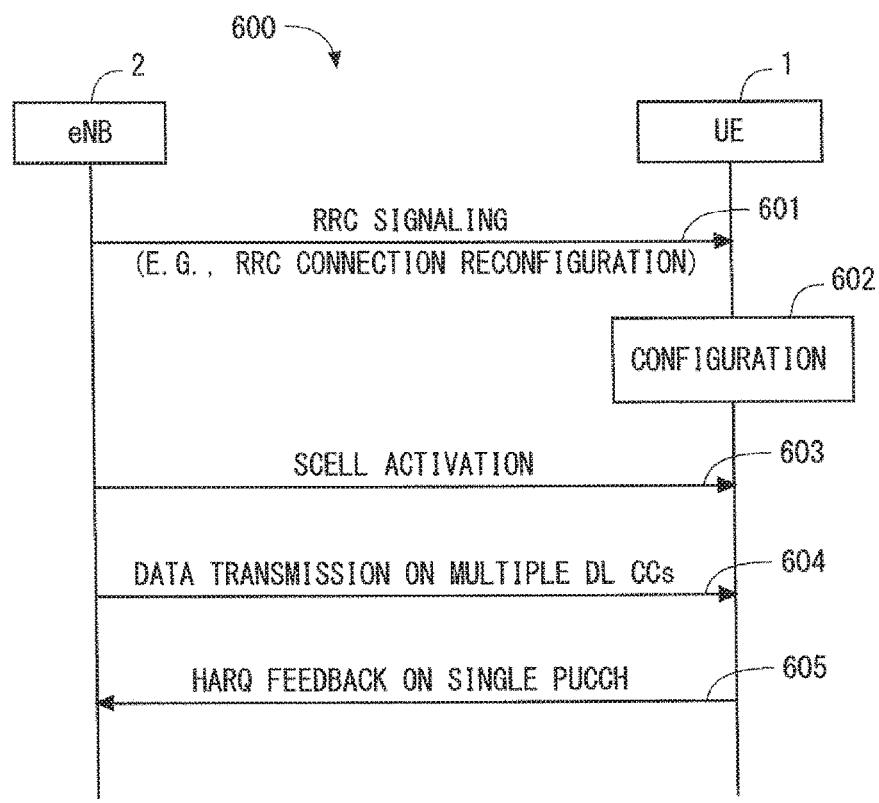
FIG. 6 is a sequence diagram illustrating an example of a communication procedure of a UE and an eNB according to a first embodiment.

Next, a specific example of a communication procedure performed by the UE 1 and the eNB 2 will be described. FIG. 6 illustrates an example (process 600) of a communication procedure performed by the UE 1 and the eNB 2. In block 601, the eNB 2 transmits one or more RRC signaling messages to the UE 1. The RRC signaling in block 601 may include, for example, an RRC Connection Setup message or may include one or more RRC Connection Reconfiguration messages. In some implementations, the RRC signaling in block 601 may include at least one RRC Connection Reconfiguration message to configure one or more secondary component carriers in the UE 1 for carrier aggregation.

In block 602, the UE 1 configures the UE 1 in accordance with the RRC signaling in block 601. The configuration in block 602 includes selecting, by the UE 1, a PUCCH format, a resource block(s) used to transmit a PUCCH (i.e., PUCCH resource), a spreading code sequence, and a spreading rate in order to transmit HARQ ACK/NACK bits, which correspond to the primary DL CC and one or more secondary DL CCs, on a PUCCH on the primary UL CC. Here, the spreading code sequence and the spreading rate are to be applied to the block-wise spreading of HARQ ACK/NACK modulation symbols. As described above, the UE 1 selects the spreading rate to be applied to the block-wise spreading of HARQ ACK/NACK modulation symbols, depending on the number of CCs configured in the UE 1.

Each of the PUCCH format, the PUCCH resource, the spreading code sequence, and the spreading rate may be indicated explicitly or implicitly by the eNB 2 in the RRC signaling in block 601. For example, in some implementations, the eNB 2 may transmit, in block 601, RRC signaling indicating that the new PUCCH format described above is to be used.

In some implementations, the eNB 2 may implicitly indicate the spreading rate to the UE 1. For example, the eNB 2 may configure one or more secondary CCs in the UE 1 to implicitly indicate to the UE 1 the spreading rate to be applied to the block-wise spreading of HARQ ACK/NACK modulation symbols. In other words, the UE 1 may select the spreading rate based on the number of CCs configured in the UE 1.

In some implementations, similarly to the exiting PUCCH formats, the eNB 2 may explicitly indicate the resource index for the new PUCCH format to the UE 1. In this case, the UE 1 may derive, from the resource index, the PUCCH resource (i.e., a RB pair used to the PUCCH transmission) and the sequence index indicating the spreading code sequence to be used.

In block 603, a part or all of the one or more secondary cells (SCells) configured in the UE 1 or, in other words, a part or all of the one or more secondary CCs (SCCs) are activated. Similarly to the exiting CA, the activation of these SCells (SCCs) may be performed by transmitting an activation/deactivation medium access control (MAC) control element (CE) from the eNB 2 to the UE 1.

In block 604, the eNB 2 transmits data to the UE 1 on a plurality of DL CCs. In block 605, in response to the data reception on the plurality of DL CCs, the UE 1 transmit HARQ ACK/NACK bits corresponding to the plurality of DL CCs on a single PUCCH on a single UL CC (e.g., the primary CC). In the PUCCH transmission in block 605, the PUCCH format, the PUCCH resource, the spreading code sequence, and the spreading rate which have been selected in block 602 are used.

Figure 7:
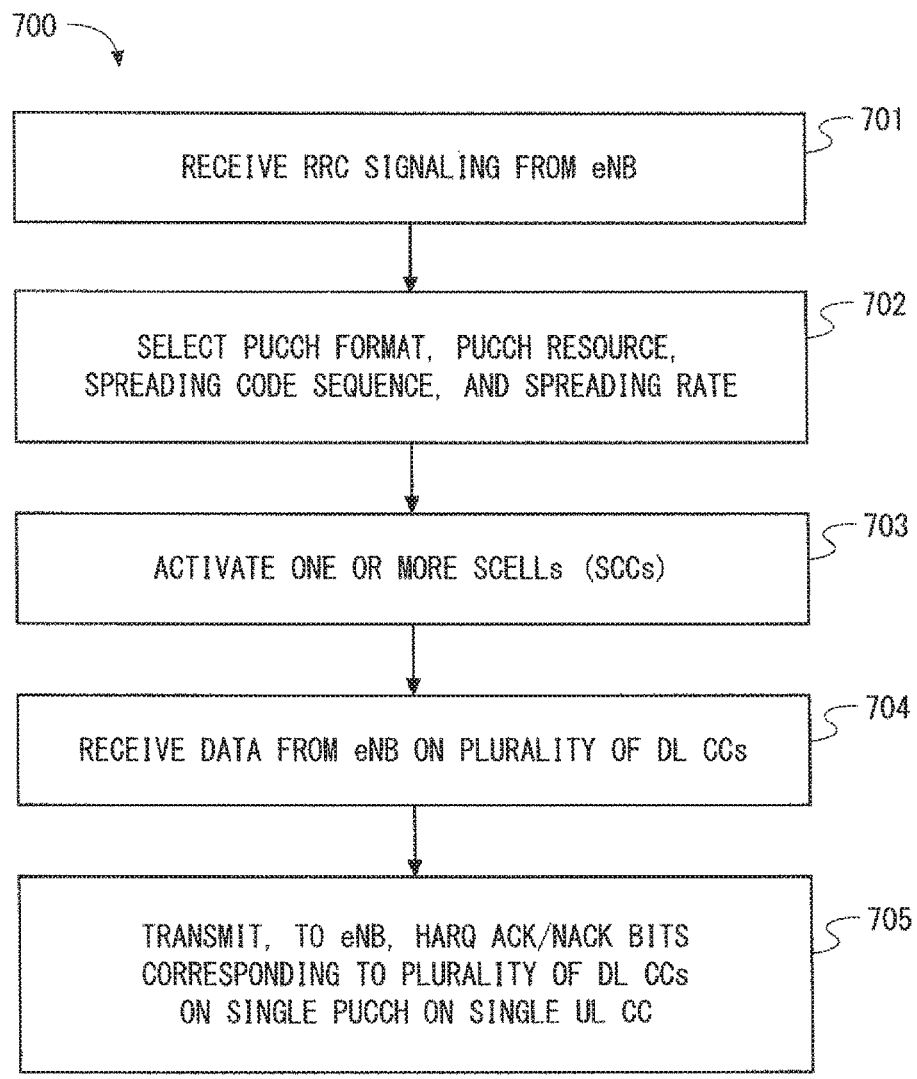
FIG. 7 is a flowchart illustrating an example of an operation performed by a UE according to the first embodiment.

FIG. 7 is a flowchart illustrating an example (process 700) of the operation performed by the UE 1. In block 701, the UE 1 receives one or more RRC signaling messages from the eNB 2. In block 702, the UE 1 selects a PUCCH format, a resource block(s) (i.e., PUCCH resource) used to transmit a PUCCH, a spreading code sequence, and a spreading rate, in accordance with the one or more RRC signaling messages in block 701. Here, the spreading code sequence and the spreading rate are to be applied to the block-wise spreading of HARQ ACK/NACK modulation symbols. As described above, the UE 1 selects the spreading rate to be applied to the block-wise spreading of HARQ ACK/NACK modulation symbols, depending on the number of CCs configured in the UE 1.

In block 703, the UE 1 activates one or more SCells (SCCs) in accordance with an instruction from the eNB 2. In block 704, the UE 1 receives data from the eNB 2 on a plurality of DL CCs. In block 705, the UE 1 transmits HARQ ACK/NACK bits corresponding to these DL CCs to the eNB 2 on a single PUCCH on a single UL CC. In the PUCCH transmission in block 705, the PUCCH format, the PUCCH resource, the spreading code sequence, and the spreading rate which have been selected in block 702 are used.

Figure 8:
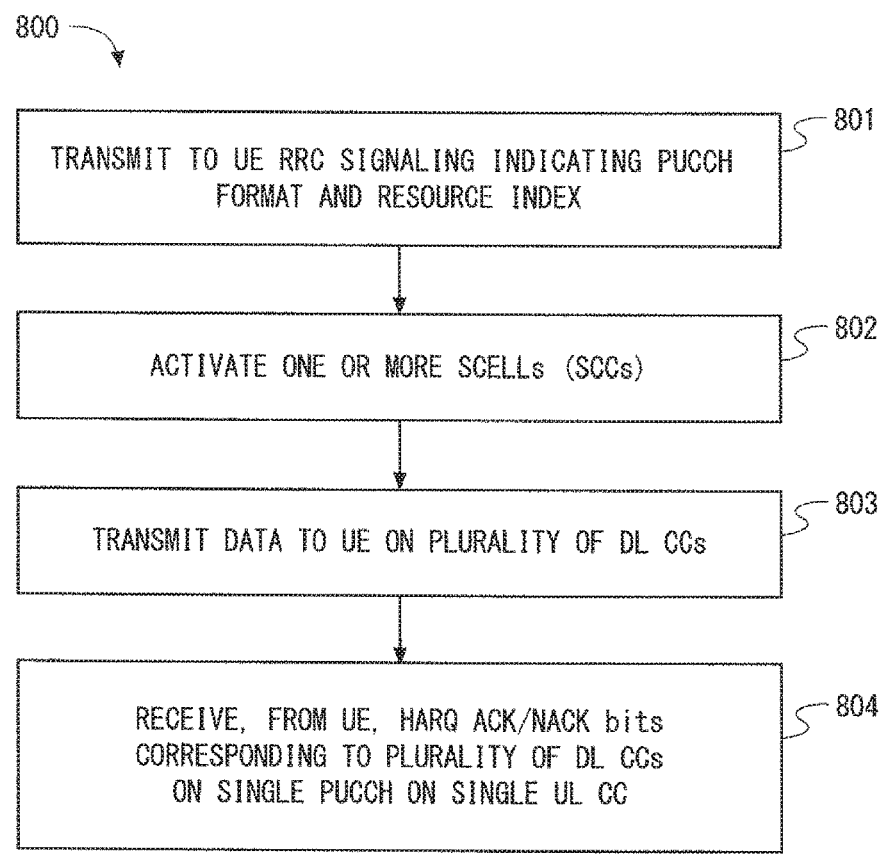
FIG. 8 is a flowchart illustrating an example of an operation performed by an eNB according to the first embodiment.

FIG. 8 is a flowchart illustrating an example (process 800) of the operation performed by the eNB 2. In block 801, the eNB 2 transmits one or more RRC signaling messages to the UE 1. This signaling explicitly or implicitly indicates to the UE 1 the PUCCH format and the spreading rate to be used by the UE 1. Here, the spreading rate is to be applied to the block-wise spreading of HARQ ACK/NACK modulation symbols. In block 802, the eNB 2 activates a part or all of the one or more SCells (SCCs) configured in the UE 1. In block 803, the eNB 2 transmits data to the UE 1 on a plurality of DL CCs. In block 605, the eNB 2 receives from the UE 1, on a single PUCCH on a single UL CC, HARQ ACK/NACK bits corresponding to the plurality of DL CCs.

Hereinafter, an example of the new PUCCH format used by the UE 1 and the eNB 2 according to the present embodiment will be described. In some implementations, the UE 1 is configured to selectively perform at least two of first, second, and third time-domain spreading operations on HARQ ACK/NACK modulation symbols, depending on the number of the DL CCs (or the number of the HARQ ACK/NACK bits) configured in the UE 1. The first, second, and third time-domain spreading operations are as follows.

The first time-domain spreading operation includes performing time-domain spreading on a single data block at a spreading rate of 2n (n is an integer) by using a first length-2n spreading code sequence. Here, the single data block is to be mapped to predetermined 2n single-carrier FDMA (SC-FDMA) symbols within a single slot in accordance with the PUCCH format used to transmit the plurality of HARQ ACK/NACK bits.

The second time-domain spreading operation includes performing time-domain spreading on two data blocks at a spreading rate of n by using a second length-n spreading code sequence and a third length-n spreading code sequence. The second spreading code sequence consists of n elements of the first spreading code sequence described above, and the third spreading code sequence consists of the remaining n elements of the first spreading code sequence described above. Here, the two data blocks are to be mapped to the same predetermined 2n SC-FDMA symbols within the same slot as in the case of the first time-domain spreading, in accordance with the PUCCH format.

The third time-domain spreading operation includes performing time-domain spreading on 2n data blocks at a spreading rate of 1 by using 2n length-1 spreading code sequences. The 2n spreading code sequences each consists of a respective one of the 2n elements of the first spreading code sequence described above. Here, the 2n data blocks are to be mapped to the same predetermined 2n SC-FDMA symbols within the same predetermined slot as in the case of the first and second time-domain spreading operations, in accordance with the PUCCH format.

In the above description of the first to third time-domain spreading operations, each data block corresponds to the HARQ ACK/NACK modulation symbols to be subjected to the block-wise spreading. In other words, according to the example of LTE, each data block includes 12 ACK/NACK modulation symbols, the number of which is equal to the number of subcarriers in one resource block.

In the above description of the first to third time-domain spreading operations, the first spreading code sequence may be determined by the UE 1 based on the resource index provided to the UE 1 by the eNB 2. In other words, the UE 1 may derive, from the resource index provided by the eNB 2, the sequence index indicating the spreading code sequence to be used.

The first length-2n spreading code sequence is one of 2n spreading code sequences that are orthogonal to each other. The spreading code sequences (or orthogonal code sequences) excluding the first spreading code sequence are used by other UEs.

Furthermore, the first spreading code sequence and at least one other spreading code sequence (hereinafter referred to as a fourth spreading code sequence) included in the 2n (orthogonal) spreading code sequences may be defined as follows. The second spreading code sequence, which is a subset of the first spreading code sequence, is orthogonal to a spreading code sequence consisting of corresponding two elements of the fourth spreading code sequence, and the third spreading code sequence, which is the remaining subset of the first spreading code sequence, is orthogonal to a spreading code sequence consisting of the remaining two elements of the fourth spreading code sequence. Using the set of the spreading code sequences that includes the first and fourth spreading code sequences defined as above makes it possible to multiplex the PUCCH transmissions of multiple users (i.e., UEs 1) using different spreading rates on the same resource block, which will be described in detail below.

Hereinafter, to facilitate understanding, a specific example in which n is equal to 2 will be described. 2n spreading code sequences, that is, four spreading code sequences may be defined as shown in Table 1 below.

TABLE 1

| SEQUENCE INDEX $n_{oc}$ | ORTHOGONAL SEQUENCE OF LENGTH 4 $[w_{n_{oc}}(0)\ w_{n_{oc}}(1)\ w_{n_{oc}}(2)\ W_{n_{oc}}(3)]$ |
|---|---|
| 0 | [+1 +1 +1 +1] |
| 1 | [+1 +1 −1 −1] |
| 2 | [+1 −1 +1 −1] |
| 3 | [+1 −1 −1 +1] |

The four spreading code sequences $w_0(i)$ to $w_3(i)$ shown in Table 1 are orthogonal to one another. Furthermore, the following relationship holds between the spreading code sequences $w_0(i)$ and $w_2(i)$. The length-2 spreading code sequence [+1 +1], which consists of the first and second elements of the spreading code sequence $w_0(i)=[+1\ +1\ +1\ +1]$, is orthogonal to the length-2 spreading code sequence [+1 −1], which consists of the first and second elements of the spreading code sequence $w_2(i)=[+1-1+1-1]$. Furthermore, the length-2 spreading code sequence [+1 +1], which consists of the third and fourth elements of the spreading code sequence $w_0(i)=[+1\ +1\ +1\ +1]$, is orthogonal to the length-2 spreading code sequence $[+1\ -1]$, which consists of the third and fourth elements of the spreading code sequence $w_2(i)=[+1\ -1\ +1\ -1]$. The relationship similar to that between the pair of the spreading code sequences $w_0(i)$ and $w_2(i)$ also holds between a pair of the spreading code sequences $w_0(i)$ and $w_3(i)$, between a pair of the spreading code sequences $w_1(i)$ and $w_2(i)$, and between a pair of the spreading code sequences $w_1(i)$ and $w_3(i)$.

Figure 9:
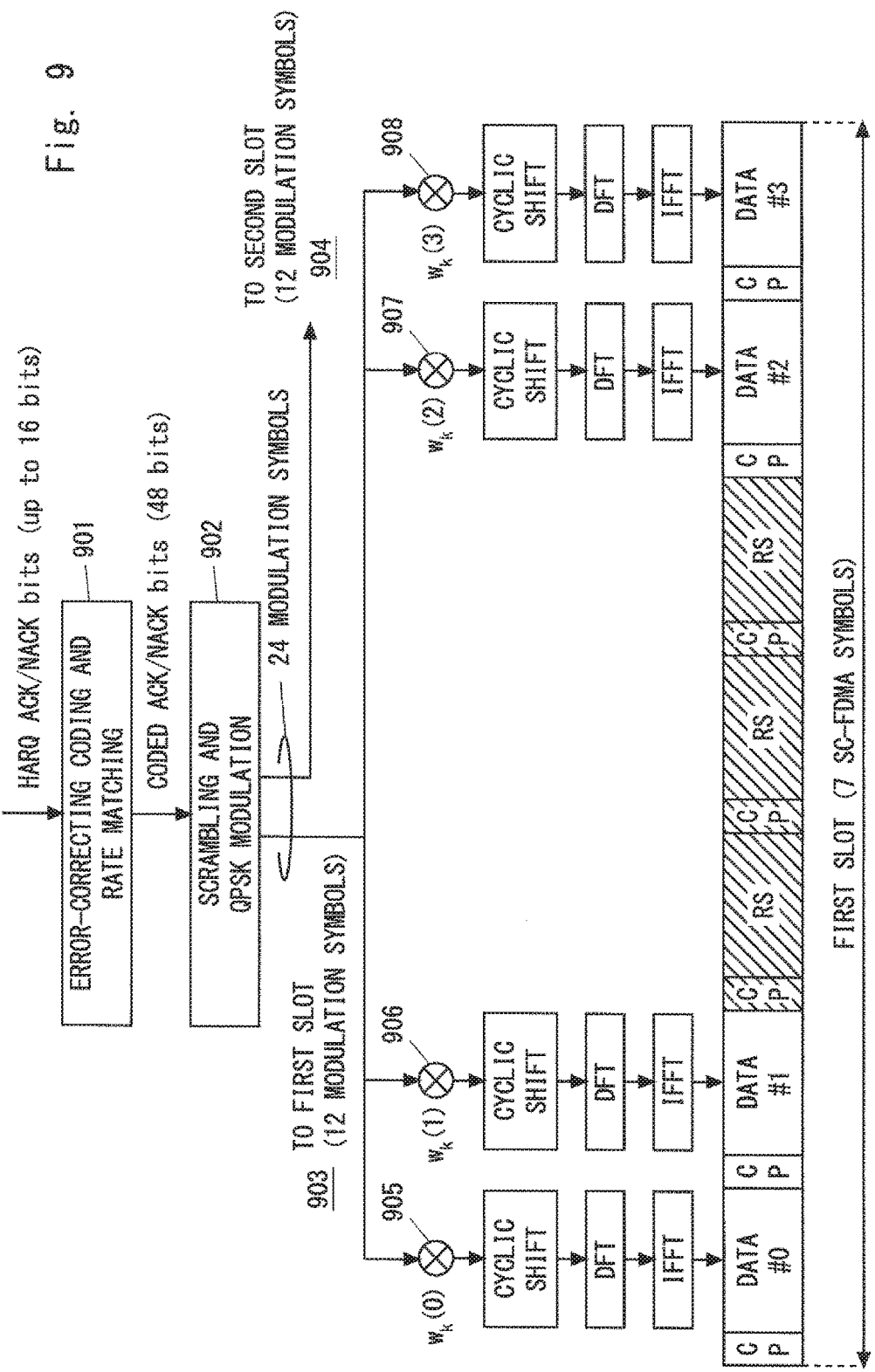
FIG. 9 illustrates an example of a transmission scheme in accordance with a PUCCH format according to the first embodiment.
Figure 10:
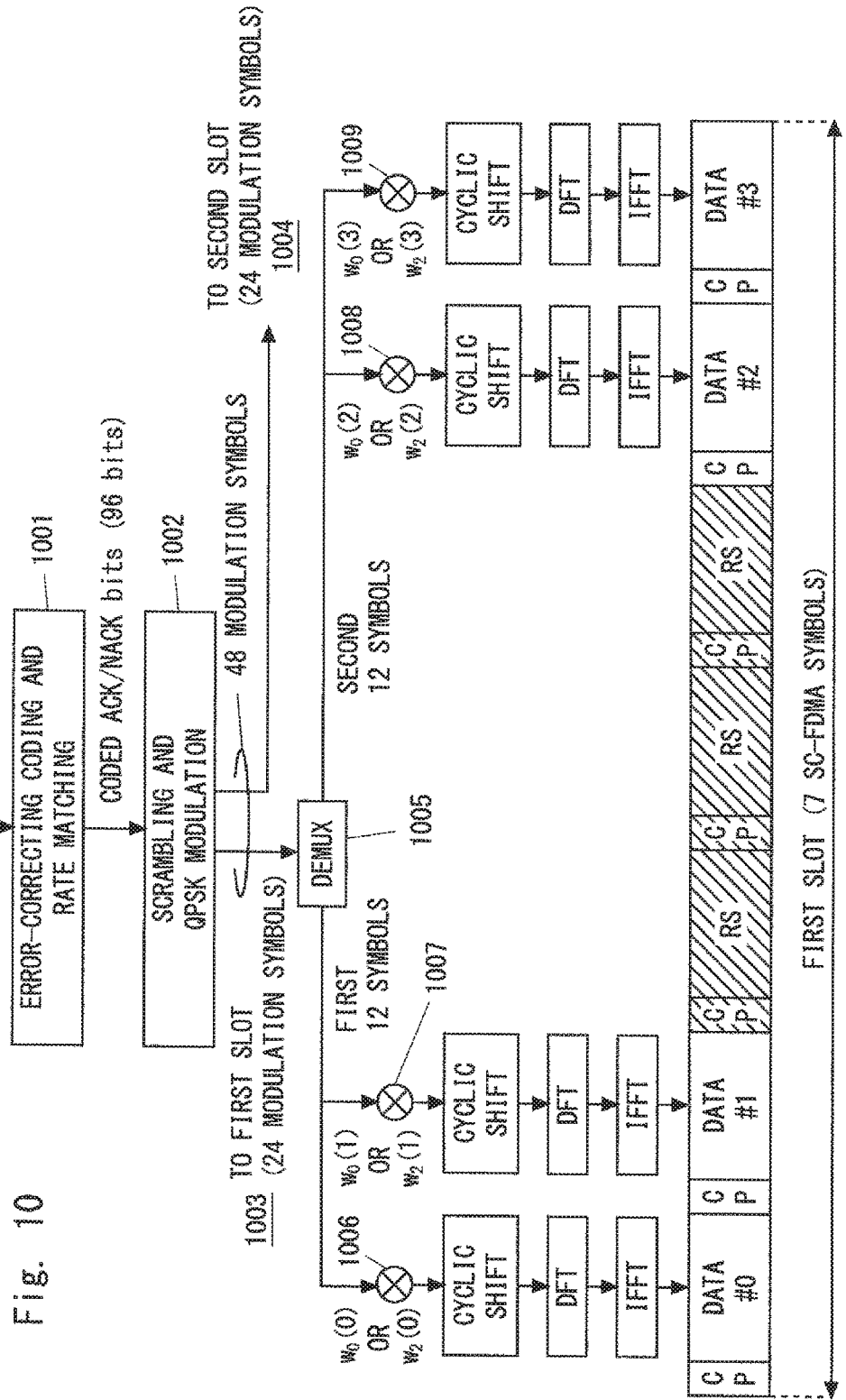
FIG. 10 illustrates an example of a transmission scheme in accordance with a PUCCH format according to the first embodiment.
Figure 11:
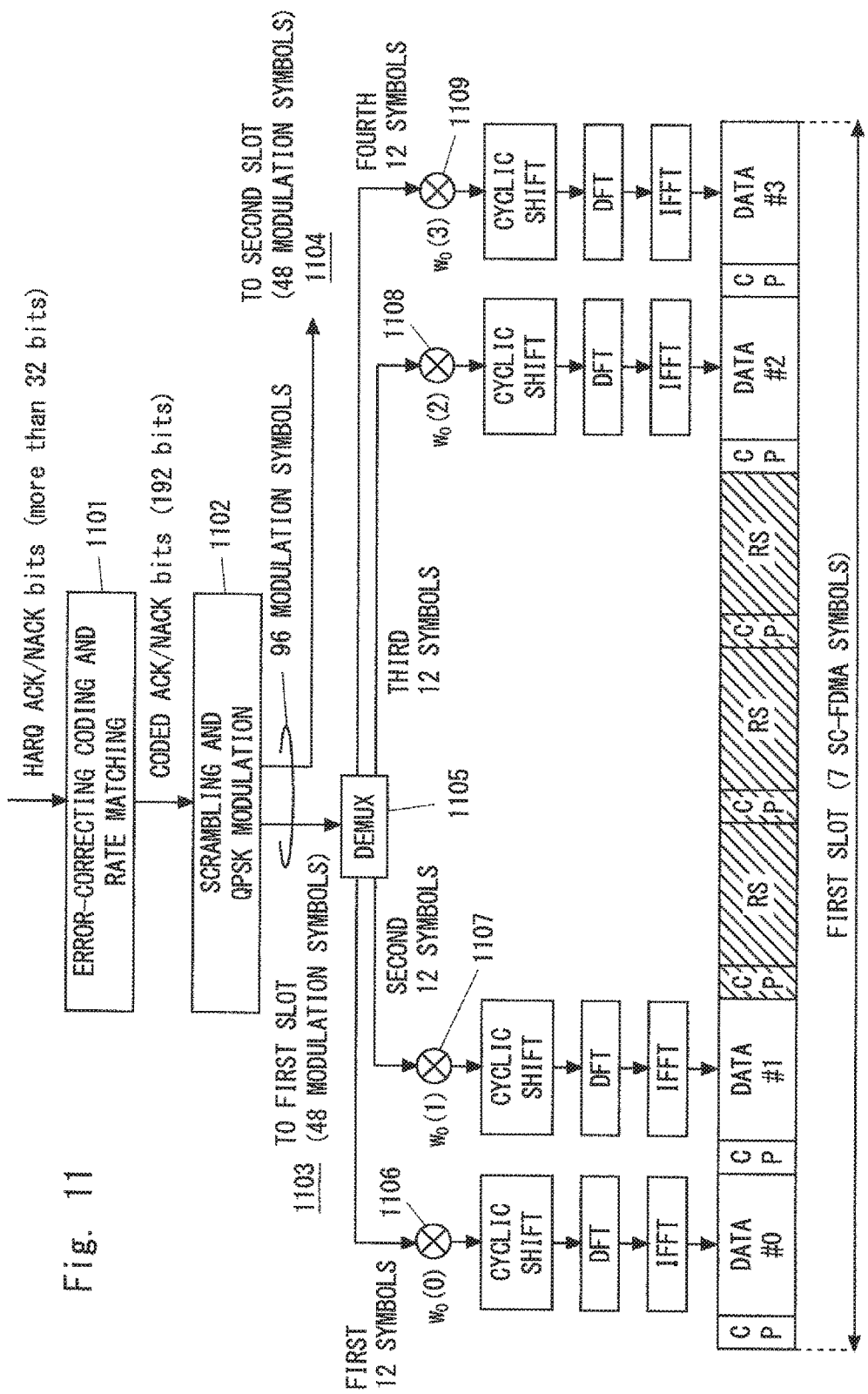
FIG. 11 illustrates an example of a transmission scheme in accordance with a PUCCH format according to the first embodiment.

FIGS. 9, 10 and 11 illustrate three specific examples of a transmission scheme using the new PUCCH format according to the present embodiment and correspond respectively to the first, second, and third time-domain spreading operations described above. Specifically, in the example illustrated in FIG. 9, the UE 1 performs the time-domain spreading (block-wise spreading) on a single data block (i.e., 12 ACK/NACK modulation symbols in this case) at a spreading rate of 4 by using any one of the length-4 spreading code sequences $w_0(i)$ to $w_3(i)$. This single data block (i.e., 12 ACK/NACK modulation symbols) is mapped to predetermined four SC-FDMA symbols within a single slot. FIG. 9 illustrates the case of a normal cyclic prefix, and the predetermined four SC-FDMA symbols are the first, second, sixth, and seventh SC-FDMA symbols among the seven SC-FDMA symbols within the single slot. The third, fourth, and fifth SC-FDMA symbols are used to transmit a reference signal (RS).

Figure 4:
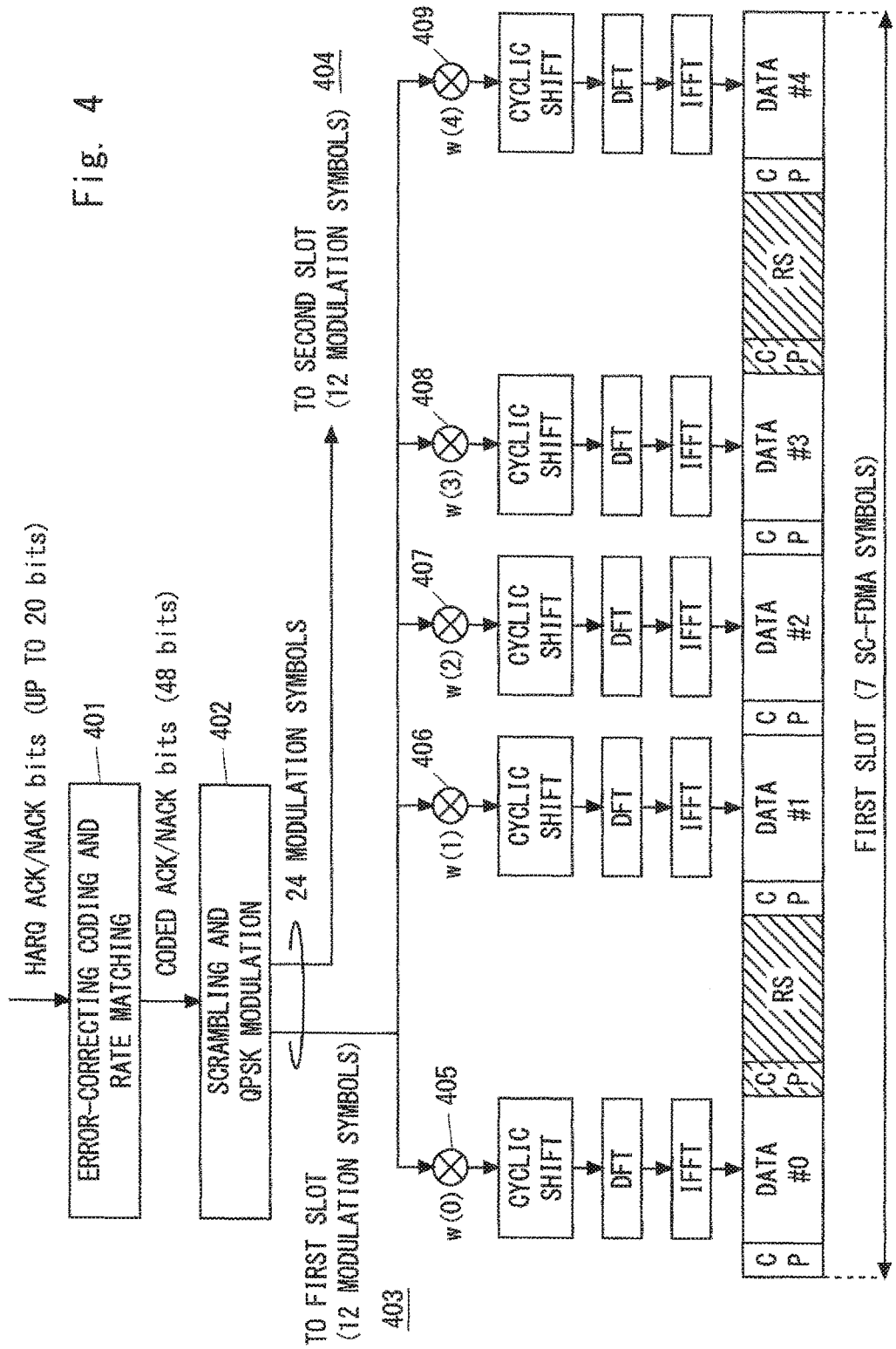
FIG. 4 illustrates a transmission scheme in accordance with the PUCCH format 3.
Figure 5:
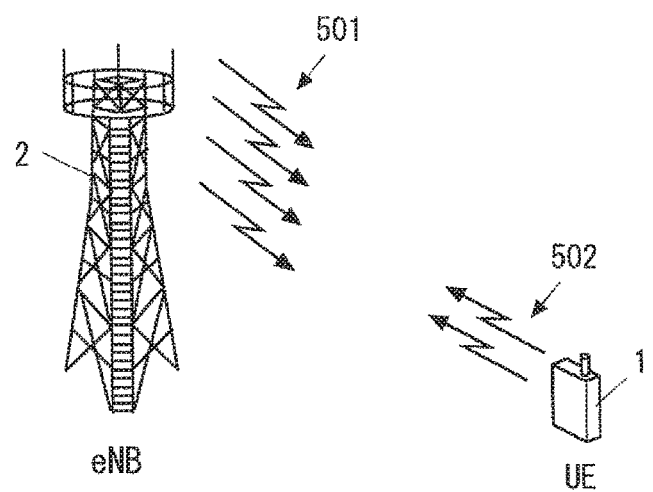
FIG. 5 illustrates a configuration example of a wireless communication system according to some embodiments.

More specifically, the transmission scheme illustrated in FIG. 9 is used when the number of HARQ ACK/NACK bits to be transmitted in a single subframe is no greater than 16, for example. The processes in blocks 901 and 902 are similar to those in block 401 and 402 in the transmission scheme for the PUCCH format 3 illustrated in FIG. 4. Specifically, in block 901, error-correcting coding and rate matching for the HARQ ACK/NACK bits (up to 16 bits) corresponding to the data reception on a plurality of DL CCs are performed, and coded ACK/NACK bits having a length of 48 bits are generated. The coded ACK/NACK bits are scrambled and then mapped to QPSK modulation symbols, and thus 24 modulation symbols are generated (902). Out of these 24 modulation symbols, 12 modulation symbols (903) are transmitted in the first slot within a subframe, and the remaining 12 modulation symbols (904) are transmitted in the second slot within the subframe. FIG. 9 illustrates a process on the 12 modulation symbols (903) transmitted in the first slot.

Block-wise spreading is performed on these 12 modulation symbols (903). Specifically, the 12 modulation symbols corresponding to one SC-FDMA symbol are spread by a spreading code sequence $[w_k(0)\ w_k(1)\ w_k(2)\ w_k(3)]$ which is one of the four length-4 spreading code sequences shown in Table 1 (904 to 908). Thus, four sets of 12 modulation symbols are obtained. These four sets of 12 modulation symbols are mapped to the predetermined four SC-FDMA symbols within the first slot. Each set of 12 modulation symbols are cyclically shifted, DFT-spread, mapped to 12 subcarriers, and converted to a time-domain signal through IFFT, and thus SC-FDMA symbols are generated.

The example illustrated in FIG. 10 corresponds to the second time-domain spreading operation described above. In the example illustrated in FIG. 10, the UE 1 performs the time-domain spreading (block-wise spreading) on two data blocks at a spreading rate of 2 by using a length-2 spreading code sequence $[w_k(0)\ w_k(1)]$ and a length-2 spreading code sequence $[w_k(2)\ w_k(3)]$. The spreading code sequence $[w_k(0)\ w_k(1)]$ consists of the first and second elements of a spreading code sequence $[w_k(0)\ w_k(1)\ w_k(2)\ w_k(3)]$ which is one of the four length-4 spreading code sequences shown in Table 1, and the spreading code sequence $[w_k(2)\ w_k(3)]$ consists of the remaining third and fourth elements of it. Here, the two data blocks are two sets of 12 ACK/NACK modulation symbols. These two data blocks are mapped to the predetermined four SC-FDMA symbols within the same slot as in the case of the example illustrated in FIG. 9 (i.e., first time-domain spreading operation) in accordance with the PUCCH format.

More specifically, the transmission scheme illustrated in FIG. 10 is used when the number of HARQ ACK/NACK bits to be transmitted in a single subframe is within a range of from 17 to 32. In block 1001, error-correcting coding and rate matching for the HARQ ACK/NACK bits (up to 32 bits) corresponding to the data reception on a plurality of DL CCs are performed, and coded ACK/NACK bits having a length of 96 bits are generated. The coded ACK/NACK bits are scrambled and then mapped to QPSK symbols, and thus 48 QPSK modulation symbols are generated (1002). Out of these 48 modulation symbols, 24 modulation symbols (1003) are transmitted in the first slot within a subframe, and the remaining 24 modulation symbols (1004) are transmitted in the second slot within the subframe. FIG. 10 illustrates a process on the 24 modulation symbols (1003) transmitted in the first slot.

These 24 modulation symbols (1003) are divided into two sets each consisting of 12 modulation symbols (1005). Then, these two sets are subjected to block-wise spreading using the length-2 spreading code sequences $[w_k(0)\ w_k(1)]$ and $[w_k(2)\ w_k(3)]$, respectively. Specifically, the first 12 modulation symbols of the 24 modulation symbols (1003) are spread by the length-2 spreading code sequence $[w_k(0)\ w_k(1)]$ (1006, 1007) and are arranged to the first and second SC-FDMA symbols through cyclic shift, DFT-spreading, and IFFT. Meanwhile, the remaining 12 modulation symbols are spread by the length-2 spreading code sequence $[w_k(2)\ w_k(3)]$ (1008, 1009) and are arranged to the sixth and seventh SC-FDMA symbols through cyclic shift, DFT-spreading, and IFFT.

The example illustrated in FIG. 11 corresponds to the third time-domain spreading operation described above. In the example illustrated in FIG. 11, the UE 1 performs the time-domain spreading on four data blocks at a spreading rate of 1 by using four length-1 spreading code sequences each consisting of a respective one of the first to fourth elements of a spreading code sequence $[w_k(0)\ w_k(1)\ w_k(2)\ w_k(3)]$ which is one of the four length-4 spreading code sequences shown in Table 1. Here, the four data blocks are four sets of 12 ACK/NACK modulation symbols. These four data blocks are mapped to the predetermined four SC-FDMA symbols within the same slot as in the case of the example illustrated in FIG. 9 (i.e., first time-domain spreading operation) in accordance with the PUCCH format.

More specifically, the transmission scheme illustrated in FIG. 11 is used when the number of HARQ ACK/NACK bits to be transmitted in a single subframe exceeds 32. In block 1101, error-correcting coding and rate matching for the HARQ ACK/NACK bits of equal to or longer than 33 bits corresponding to the data reception on a plurality of DL CCs are performed, and coded ACK/NACK bits having a length of 192 bits are generated. The coded ACK/NACK bits are scrambled and then mapped to QPSK symbols, and thus 96 QPSK modulation symbols are generated (1102). Out of these 96 modulation symbols, 48 modulation symbols (1103) are transmitted in the first slot within a subframe, and the remaining 48 modulation symbols (1104) are transmitted in the second slot within the subframe. FIG. 11 illustrates a process on the 48 modulation symbols (1103) transmitted in the first slot.

These 48 modulation symbols (1103) are divided into four sets each consisting of 12 modulation symbols (1105). Then, these four sets are subjected to block-wise spreading using the length-1 spreading code sequences [$w_k(0)$], [$w_k(1)$], [$w_k(2)$], and [$w_k(3)$], respectively. Specifically, the first 12 modulation symbols of the 48 modulation symbols (1103) are spread by the length-1 spreading code sequence [$w_k(0)$] (1106) and are arranged to the first SC-FDMA symbol through cyclic shift, DFT-spreading, and IFFT. The second 12 modulation symbols of the 48 modulation symbols (1103) are spread by the length-1 spreading code sequence [$w_k(1)$] (1107) and are arranged to the second SC-FDMA symbol through cyclic shift, DFT-spreading, and IFFT. The third 12 modulation symbols of the 48 modulation symbols (1103) are spread by the length-1 spreading code sequence [$w_k(2)$] (1108) and are arranged to the sixth SC-FDMA symbol through cyclic shift, DFT-spreading, and IFFT. Lastly, the fourth 12 modulation symbols of the 48 modulation symbols (1103) are spread by the length-1 spreading code sequence [$w_k(3)$] (1109) and are arranged to the seventh SC-FDMA symbol through cyclic shift, DFT-spreading, and IFFT.

Applying the new PUCCH format and the transmission schemes thereof described with reference to Table 1 and FIG. 9 to FIG. 11, when HARQ ACK/NACK bits corresponding to DL CCs configured in the UE 1 are transmitted on a single PUCCH on a single UL CC, the UE 1 can change the spreading rate of the time-domain spreading (i.e., block-wise spreading) of ACK/NACK modulation symbols, depending on the number of the DL CCs or the number of the HARQ ACK/NACK bits.

Furthermore, applying the new PUCCH format and the transmission schemes thereof described with reference to Table 1 and FIG. 9 to FIG. 11, multiple users (i.e., UEs 1) using different spreading rates for the time-domain spreading on the ACK/NACK modulation symbols can be multiplexed on the same resource block. Specifically, two UEs 1 following the transmission scheme illustrated in FIG. 9 and one UE 1 following the transmission scheme illustrated in FIG. 10 can transmit their PUCCHs on the same resource block.

In one example, one of the two UEs 1 that follow the transmission scheme illustrated in FIG. 9 may use the spreading code sequence $w_2(i)$=[+1 −1 +1 −1] shown in Table 1, the other UE 1 may use $w_3(i)$=[+1 −1 −1 +1], and the one UE 1 that follows the transmission scheme illustrated in FIG. 10 may use $w_0(i)$=[+1 +1 +1 +1] or $w_1(i)$=[+1 +1 −1 −1]. As described above, the length-2 spreading code sequence [+1 +1] consisting of the first and second elements of the spreading code sequence $w_0(i)$=[+1 +1 +1 +1] is orthogonal to the length-2 spreading code sequence [+1 −1] consisting of the first and second elements of the spreading code sequence $w_2(i)$=[+1 −1 +1 −1]. Furthermore, the length-2 spreading code sequence [+1 +1] consisting of the third and fourth elements of the spreading code sequence $w_0(i)$=[+1 +1 +1 +1] is orthogonal to the length-2 spreading code sequence [+1 −1] consisting of the third and fourth elements of the spreading code sequence $w_2(i)$=[+1 −1 +1 −1]. The relationship similar to that between the pair of the spreading code sequences $w_0(i)$ and $w_2(i)$ also holds between a pair of the spreading code sequences $w_0(i)$ and $w_3(i)$, between a pair of the spreading code sequences $w_1(i)$ and $w_2(i)$, and between a pair of the spreading code sequences $w_1(i)$ and $w_3(i)$. Therefore, the PUCCH transmission at a spreading rate of 4 that follows the transmission scheme illustrated in FIG. 9 and the PUCCH transmission at a spreading rate of 2 that follows the transmission scheme illustrated in FIG. 10 can be multiplexed on the same resource block since the interference therebetween is suppressed due to the orthogonality of the spreading code sequences.

In one example, the four length-4 spreading code sequences shown in Table 1 may be assigned to the users (i.e., UEs 1) as shown in Table 2. In the table, "#bit" represents the number of HARQ ACK/NAK bits to be transmitted by each user in one subframe. In addition, "CODE #0," "CODE #1," "CODE #2," and "CODE #3" in the table represent respectively the four spreading code sequences (i.e., orthogonal sequences) $w_0(i)$, $w_1(i)$, $w_2(i)$, and $w_3(i)$ shown in Table 1.

TABLE 2

|  | USER #0 | USER #1 | USER #2 | USER #3 |
|---|---|---|---|---|
| CASE 1 | 32 < #bit<br>CODE #0 | — | — | — |
| CASE 2 | 16 < #bit ≤ 32<br>CODE #0 | 16 < #bit ≤ 32<br>CODE #2 | — | — |
| CASE 3 | 16 < #bit ≤ 32<br>CODE #0 or #1 | #bit ≤ 16<br>CODE #2 | #bit ≤ 16<br>CODE #3 | — |
| CASE 4 | #bit ≤ 16<br>CODE #0 | #bit ≤ 16<br>CODE #1 | #bit ≤ 16<br>CODE #2 | #bit ≤ 16<br>CODE #3 |

It should be noted that Table 2 is merely an example. For example, in CASE 1, USER #0 may use any one of CODE #0 to CODE #4. In CASE 2, USER #0 may use CODE #1 instead of CODE #0, and USER #1 may use CODE #3 instead of CODE #2. In CASE 3, USER #0 may use CODE #2 or CODE #3, USER #1 may use CODE #0, and USER #2 may use CODE #1.

The set of the spreading code sequences shown in Table 1 is merely an example. Another set having orthogonality similar to that of the set of the spreading code sequences shown in Table 1 may instead be used.

In the transmission schemes illustrated in FIG. 9 to FIG. 11, the arrangement of the four data symbols #1 to #4 and the three RS symbols in the seven SC-FDMA symbols within a single slot is an example. The arrangement of the data symbols and the RS symbols within a single slot may be modified as described later in a second embodiment, for example.

Second Embodiment

In the present embodiment, each UE 1 transmits a PUCCH in accordance with a PUCCH format and a transmission scheme similar to those of the first embodiment. However, in the PUCCH format, HARQ ACK/NACK modulation symbols are arranged in SC-FMDA symbols other than the last SC-FDMA symbol (i.e., the seventh SC-FDMA symbol) within each slot. In this case, the last SC-FDMA symbol (the seventh SC-FDMA symbol) within each slot may be used to transmit a reference signal (RS) symbol.

Figure 12:
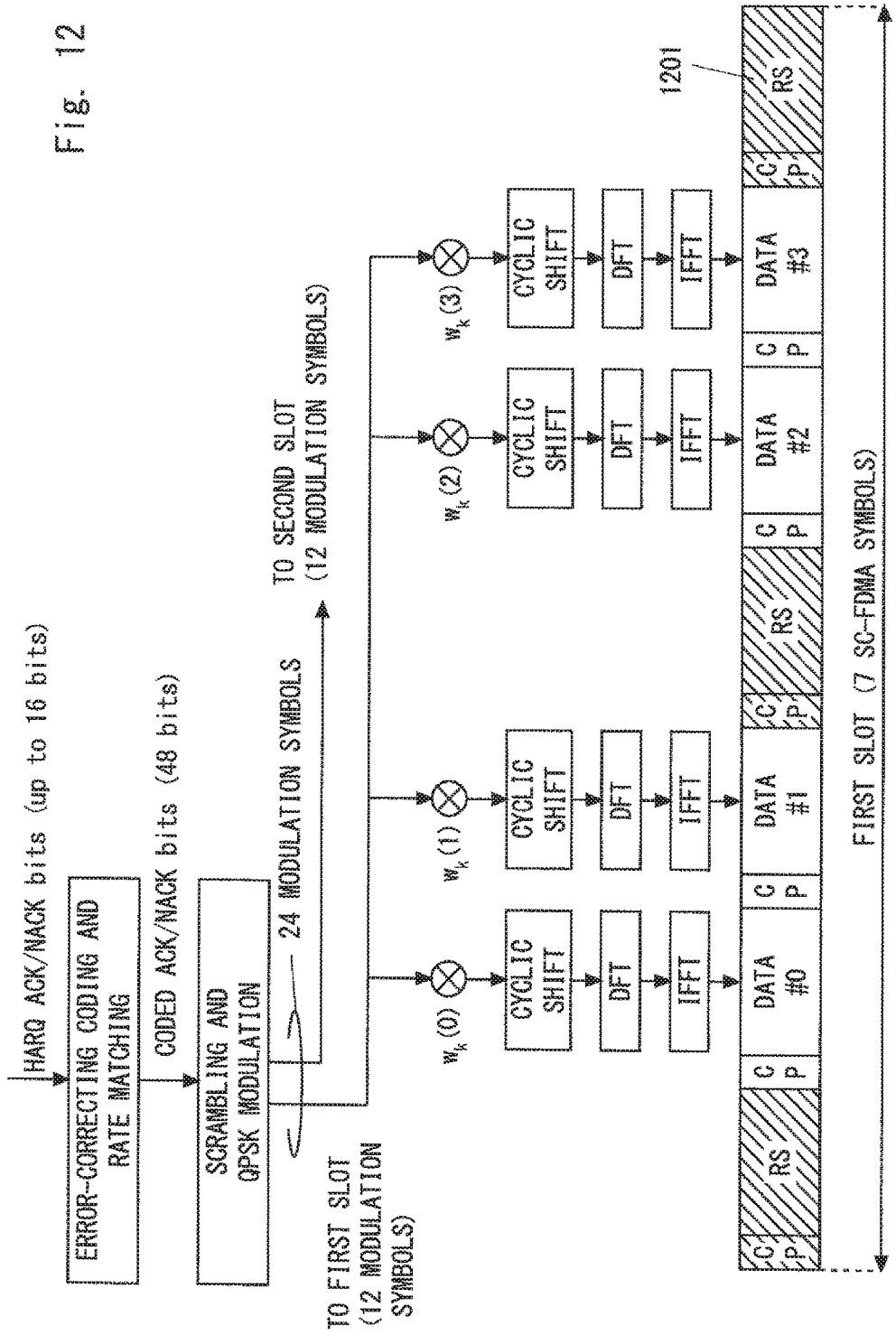
FIG. 12 illustrates an example of a transmission scheme in accordance with a PUCCH format according to a second embodiment.
Figure 13:
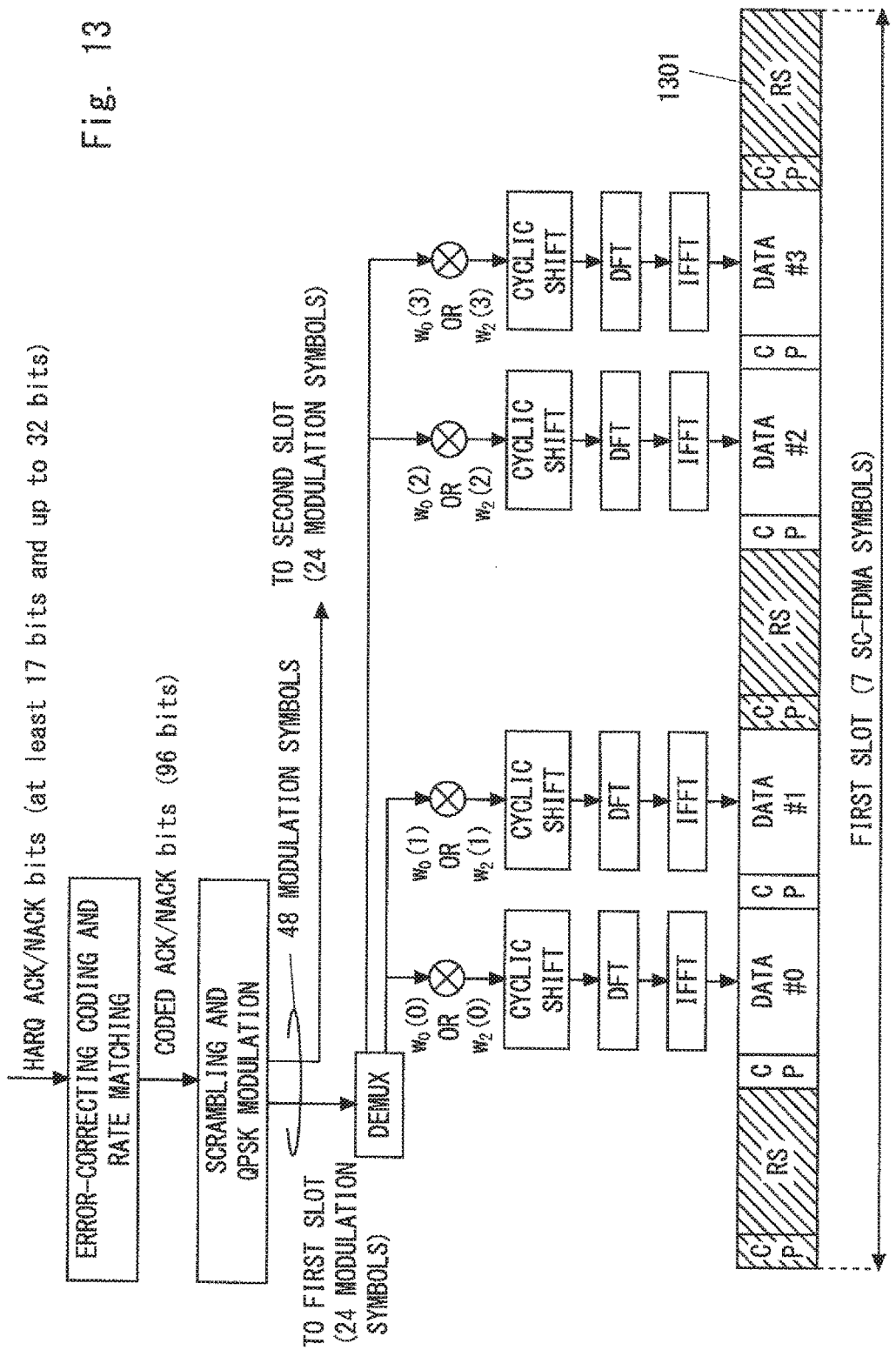
FIG. 13 illustrates an example of a transmission scheme in accordance with a PUCCH format according to the second embodiment.
Figure 14:
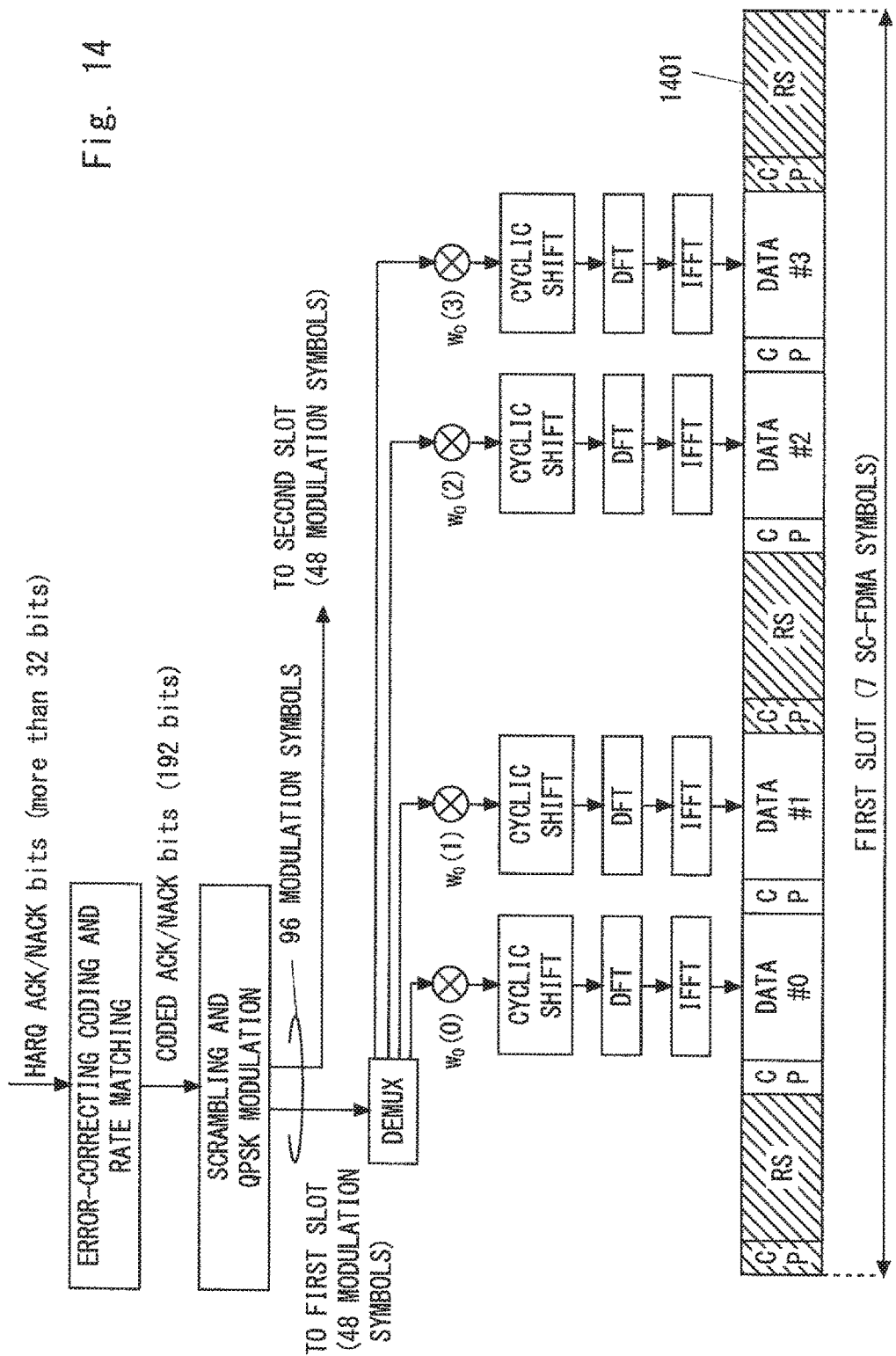
FIG. 14 illustrates an example of a transmission scheme in accordance with a PUCCH format according to the second embodiment.

FIGS. 12, 13 and 14 illustrate three specific examples of a transmission scheme in accordance with the PUCCH format according to the present embodiment. FIGS. 12, 13 and 14 correspond respectively to FIGS. 9, 10 and 11 described in the first embodiment and are identical to FIGS. 9, 10 and 11 except in the arrangement of the four data symbols #1 to #4 and the three RS symbols. As can be understood from FIG. 12, FIG. 13, and FIG. 14, each of the last SC-FDMA symbols 1201, 1301, and 1401 within the slot is not used to transmit ACK/NACK modulation symbols but used to transmit an RS symbol.

In LTE, each UE is required to transmit a sounding reference signal (SRS) periodically at the transmission interval configured by the eNB. SRS is time-multiplexed on the position of the last SC-FDMA symbol in a subframe in which the SRS is transmitted. Therefore, when transmitting HARQ ACK/NACK in accordance with the exiting PUCCH format 1a/ab or 3, the UE 1 uses shortened PUCCH transmission in the SRS transmission subframes, and thus the last SC-FDMA symbol of the ACK/NACK (i.e., the last symbol within the second slot of the subframe) is not transmitted. The UE 1 refrains from transmitting a PUCCH with an SRS, and thus the single-carrier property or nature can be retained. When HARQ ACK/NACK and an SRS are configured in the same subframe, the UE 1 uses a transmission format in which the length of the orthogonal spreading code sequence for the time-domain spreading is reduced by one, and thus the last PUCCH symbol is punctured. Such a transmission format is known as a shortened PUCCH format. In the case of the PUCCH format 3, the UE uses length-4 Walsh-Hadamard codes in place of length-5 DFT spreading codes.

If the shortened PUCCH transmission (or shortened PUCCH format) is applied to FIGS. 9, 10 and 11 described in the first embodiment, the PUCCH symbol arranged in the last SC-FDMA symbol in the second slot needs to be punctured. In this case, the UE 1 has to use length-3 DFT spreading codes in place of the length-4 Walsh-Hadamard codes as shown in Table 1. However, the use of length-3 spreading codes (i.e., spreading codes having a length of an odd number) prevents the multiplexing of PUCCH transmissions of users using different spreading rates on the same resource block described with reference to Table 1 and FIGS. 9 to 11. In contrast, by arranging an RS symbol (i.e., demodulation RS (DMRS) symbol), instead of a PUCCH symbol, on the last SC-FDMA symbol within a slot as the RS (DMRS) symbols are punctured, no problem arises in the orthogonality among the plurality of UEs 1.

Third Embodiment

In the present embodiment, a UE 1 is configured to adjust the transmission power of a PUCCH depending on whether a sounding reference signal (SRS) is transmitted in a slot. The adjustment of the transmission power of the PUCCH depending on the presence of the SRS transmission may be performed by adding an offset $\Delta_{ShortFormat}$ to the transmission power of the PUCCH when the SRS is transmitted. The eNB 2 may transmit a signaling message indicating the offset $\Delta_{ShortFormat}$ to the UE 1.

According to the present embodiment, the transmission power of PUCCH can be adjusted depending on whether a sounding reference signal (SRS) is transmitted in a slot. For example, if the new PUCCH format illustrated in the second embodiment is used, the RS (DMRS) symbol arranged in the last SC-FDMA symbol in the second slot is punctured for the shortened PUCCH transmission. Due to the decrease in the number of RS (DMRS) symbols, the reception performance of the PUCCH in the eNB 2 may be degraded. To address this problem, in some implementations, the UE 1 may add the offset $\Delta_{ShortFormat}$ to the transmission power of the PUCCH in the slot in which the RS (DMRS) symbol is punctured in order to transmit an SRS. In this way, the degradation of the PUCCH reception performance due to the puncture of the RS (DMRS) symbols can be compensated.

Hereinafter, a specific example of the definition of the offset $\Delta_{ShortFormat}$ will be illustrated. In Section 5.1.2.1 of 3GPP TS 36.213 V12.5.0, the transmission power of the PUCCH is defined by the following expression (1):

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array} \right\}, \quad (1)$$

where i represents the subframe number, F and F' represent the PUCCH format.

In the present embodiment, the following expression (2) obtained by modifying the expression (1) may be used:

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) + \Delta_{ShortFormat} \end{array} \right\}, \quad (2)$$

described with reference to FIGS. 12, 13 and 14, the UE 1 can use the length-4 Walsh-Hadamard codes also in the shortened PUCCH transmission (or shortened PUCCH format). Therefore, the PUCCH transmissions of UEs 1 using different spreading rates can be multiplexed on the same resource block in the SRS transmission subframe as well.

It is to be noted that the RS (DMRS) symbols are not subjected to spreading codes (orthogonal codes, OCCs) for the time-domain spreading, but RS s of a plurality UEs are multiplexed with different cyclic shifts. Therefore, even if where $\Delta_{ShortFormat}$ is an offset added to a normal value and is configured by higher layers. The UE 1 applies $\Delta_{ShortFormat}$ configured by higher layers when using the shortened PUCCH format and applies $\Delta_{ShortFormat}=0$ when using a normal PUCCH format.

Alternatively, the following expression (3) obtained by modifying the expression (1) may be used in the present embodiment:

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) + \Delta_{ShortFormat}(F'') \end{array} \right\}, \quad (3)$$

where F''' represents the PUCCH format. Specifically, in the example using the expression (3), the offset $\Delta_{ShortFormat}$ is configured for each PUCCH format. In this way, the performance can be tuned for each PUCCH format.

Figure 15:
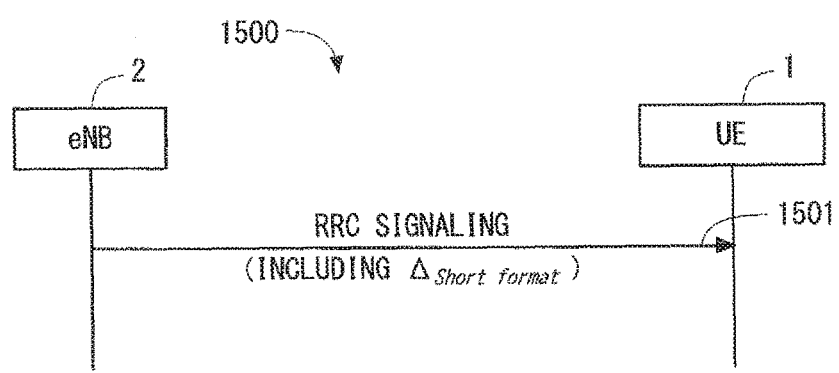
FIG. 15 is a sequence diagram illustrating an example of a communication procedure performed by a UE and an eNB according to a third embodiment.

As described above, the offset $\Delta_{ShortFormat}$ (or $\Delta_{ShortFormat}$ (F″)) may be configured in the UE 1 by the eNB 2. FIG. 15 illustrates an example (process 1500) of a signaling procedure for configuring the offset $\Delta_{ShortFormat}$ (or $\Delta_{ShortFormat}$ (F″)) in the UE 1. In block 1501, the eNB 2 transmits RRC signaling including the offset $\Delta_{ShortFormat}$ (or $\Delta_{ShortFormat}$ (F″)) to the UE 1. This RRC signaling may be, for example, an RRC Connection Setup message or an RRC Connection Reconfiguration message.

FIG. 16 illustrates a specific example of an information element transmitted to the UE 1 from the eNB 2 to configure the offset $\Delta_{ShortFormat}$ in the UE 1. This information element may be defined as one of UplinkPowerControl information elements (IEs). This information element may be included in UplinkPowerControlDedicated IE or UplinkPowerControlCommon IE. In the example illustrated in FIG. 16, the offset $\Delta_{ShortFormat}$ is configured only for the new PUCCH format (referred to as "PUCCH format 4", herein). The items "dB0," "dB1," "dB2," and "dB3" mean that the offset value is 0 dB, 1 dB, 2 dB, and 3 dB, respectively.

FIG. 17 illustrates another specific example of an information element transmitted to the UE 1 from the eNB 2 to configure the offset $\Delta_{ShortFormat}$ (F″) in the UE 1. This information element may be defined as one of UplinkPowerControl information elements (IEs). This information element may be included in UplinkPowerControlDedicated IE or UplinkPowerControlCommon IE. In the example illustrated in FIG. 17, the offset $\Delta_{ShortFormat}$ is configured individually for all the PUCCH formats including the new PUCCH format (referred to as "PUCCH format 4", herein). It is to be noted that the offset values indicated in the examples illustrated in FIGS. 16 and 17 are merely examples. For example, the number of the candidates for the offset value need not be four and may be no more than three or no less than five. In addition, in the example illustrated in FIG. 17, different sets of candidates for the offset value may be configured for the different PUCCH formats.

Fourth Embodiment

In the present embodiment, a UE 1 is configured to adjust the transmission power of a PUCCH depending on the spreading rate of the time-domain spreading (i.e., block-wise spreading) applied to HARQ ACK/NACK modulation symbols. The adjustment of the transmission power of the PUCCH depending on the spreading rate may be performed by adding, to the transmission power of the PUCCH, an offset $\Delta_{F\_PUCCH}(F)$ corresponding to the spreading rate. The eNB 2 may transmit a signaling message indicating the offset $\Delta_{F\_PUCCH}(F)$ to the UE 1.

In the present embodiment, the offset $\Delta_{F\_PUCCH}(F)$ may be configured for each spreading rate by using the expression (1), the expression (2), or the expression (3) described above.

Figure 18:
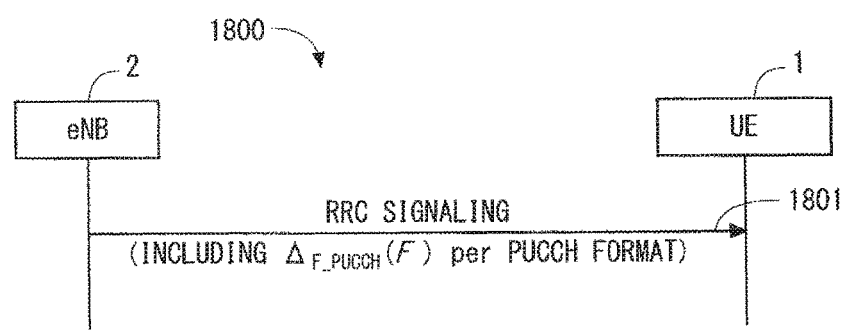
FIG. 18 is a sequence diagram illustrating an example of a communication procedure performed by a UE and an eNB according to a fourth embodiment.

As described above, the offset $\Delta_{F\_PUCCH}(F)$ for each spreading rate may be configured in the UE 1 by the eNB 2. FIG. 18 illustrates an example (process 1800) of a signaling procedure for configuring the offset $\Delta_{F\_PUCCH}(F)$ for each spreading rate in the UE 1. In block 1801, the eNB 2 transmits RRC signaling including the offset $\Delta_{F\_PUCCH}(F)$ for each spreading rate to the UE 1. This RRC signaling may be, for example, an RRC Connection Setup message or an RRC Connection Reconfiguration message.

FIG. 19 illustrates a specific example of an information element transmitted to the UE 1 from the eNB 2 to configure the offset $\Delta_{F\_PUCCH}(F)$ for each spreading rate in the UE 1. This information element may be defined as one of Uplink-PowerControl information elements (IEs). This information element may be included in UplinkPowerControlDedicated IE or UplinkPowerControlCommon IE. The item "deltaF-PUCCH-Format4-SF1" indicates the offset when the spreading rate is 1 in the new PUCCH format (referred to as "PUCCH format 4", herein). In a similar manner, "deltaF-PUCCH-Format4-SF2" and "deltaF-PUCCH-Format4-SF4" indicate the offsets when the spreading rates are 2 and 4, respectively.

In FIG. 19, for example, "deltaF−1," "deltaF0," and "deltaF3" mean that the offset values are −1 dB, 0 dB, and 3 dB, respectively. In the example illustrated in FIG. 19, as the spreading rate is smaller, the minimum value and the maximum value of the offset candidate are set greater. Generally, as the spreading rate becomes smaller, the gain obtained by the de-spreading process at the receiver side (i.e., spreading gain) is smaller. Therefore, the degradation in the reception performance resulting from a small spreading gain can be compensated by allowing a greater offset value (i.e., greater PUCCH transmission power) as the spreading rate decreases.

Figure 20:
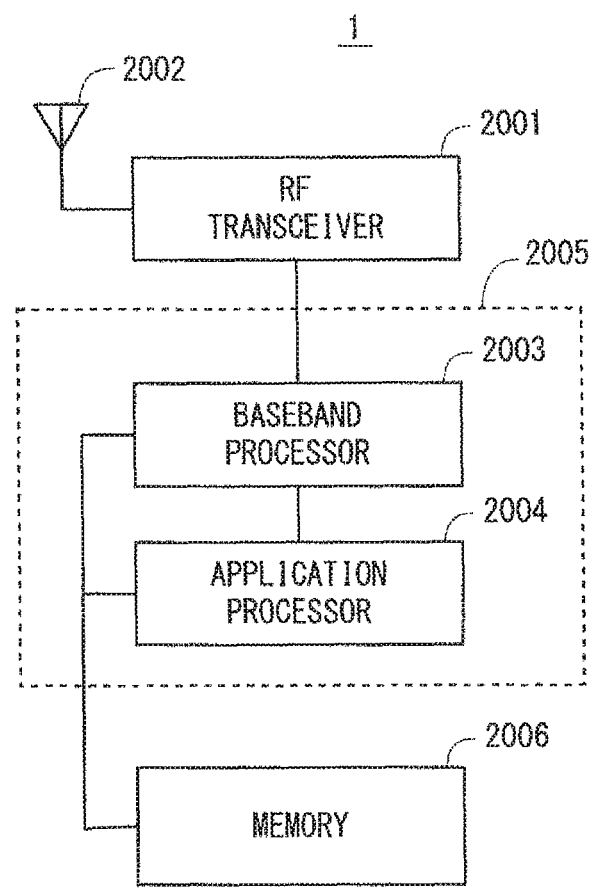
FIG. 20 is a block diagram illustrating a configuration example of a UE according to some embodiments.

Lastly, configuration examples of the UE 1 and the eNB 2 according to the above-described embodiments will be described. FIG. 20 is a block diagram illustrating a configuration example of the UE 1. A radio frequency (RF) transceiver 2001 performs analog RF signal processing to communicate with the eNB 2. The analog RF signal processing performed by the RF transceiver 2001 includes frequency up-conversion, frequency down-conversion, and amplification. The RF transceiver 2001 is coupled to an antenna 2002 and a baseband processor 2003. Specifically, the RF transceiver 2001 receives modulated symbol data (or OFDM symbol data) from the baseband processor 2003, generates a transmission RF signal, and supplies the transmission RF signal to the antenna 2002. In addition, the RF transceiver 2001 generates a baseband reception signal based on a reception RF signal received by the antenna 2002 and supplies the baseband reception signal to the baseband processor 2003.

The baseband processor 2003 performs digital baseband signal processing (i.e., data plane processing) and control plane processing for wireless communication. The digital baseband signal processing includes (a) data compression/decompression, (b) segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control plane processing includes communication management of layer 1 (e.g., transmission power control), layer 2 (e.g., radio resource management and hybrid automatic repeat request (HARQ) processing), and layer 3 (e.g., signalling regarding attach, mobility, and call management).

For example, in the case of LTE and LTE-Advanced, the digital baseband signal processing performed by the baseband processor 2003 may include signal processing of a packet data convergence protocol (PDCP) layer, a radio link control (RLC) layer, a MAC layer, and a PHY layer. In addition, the control plane processing performed by the baseband processor 2003 may include processing of a non-access stratum (NAS) protocol, an RRC protocol, and MAC CEs.

The baseband processor 2003 may include a modem processor (e.g., digital signal processor (DSP)) that performs the digital baseband signal processing and a protocol stack processor (e.g., central processing unit (CPU) or micro processing unit (MPU)) that performs the control plane processing. In this case, the protocol stack processor that performs the control plane processing may be integrated with an application processor 2004 described in the following.

The application processor 2004 is also referred to as a CPU, an MPU, a microprocessor, or a processor core. The application processor 2004 may include a plurality of processors (processor cores). The application processor 2004 loads a system software program (Operating System (OS)) and various application programs (e.g., phone call application, WEB browser, mailer, camera operation application, and music player application) from a memory 2006 or another memory (not illustrated) and executes these programs, thereby providing various functions of the UE 1.

In some implementations, the baseband processor 2003 and the application processor 2004 may be integrated on a single chip as represented by a dashed line (2005) in FIG. 20. In other words, the baseband processor 2003 and the application processor 2004 may be implemented in a single System on Chip (SoC) device 2005. The SoC device may also referred to as a system large-scale integration (LSI) or a chip set.

The memory 2006 is a volatile memory, a non-volatile memory, or a combination thereof. The memory 2006 may include a plurality of physically independent memory devices. The volatile memory is, for example, a static random-access memory (SRAM), a dynamic RAM (DRAM), or a combination thereof. The non-volatile memory is a mask read-only memory (MROM), an electrically erasable programmable ROM (EEPROM), a flash memory, a hard disk drive, or any combination thereof. The memory 2006 may include, for example, an external memory device accessible from the baseband processor 2003, the application processor 2004, and the SoC 2005. The memory 2006 may include a built-in memory device integrated within the baseband processor 2003, the application processor 2004, or the SoC 2005. The memory 2006 may include a memory within a universal integrated circuit card (UICC).

The memory 2006 may store a software module(s) (computer program(s)) including instructions and data for performing the processing of the UE 1 described in the embodiments described above. In some implementations, the baseband processor 2003 or the application processor 2004 may be configured to load this software module(s) from the memory 2006 and executes the loaded software module(s), thereby performing the process of the UE 1 described in the above-described embodiments.

Figure 21:
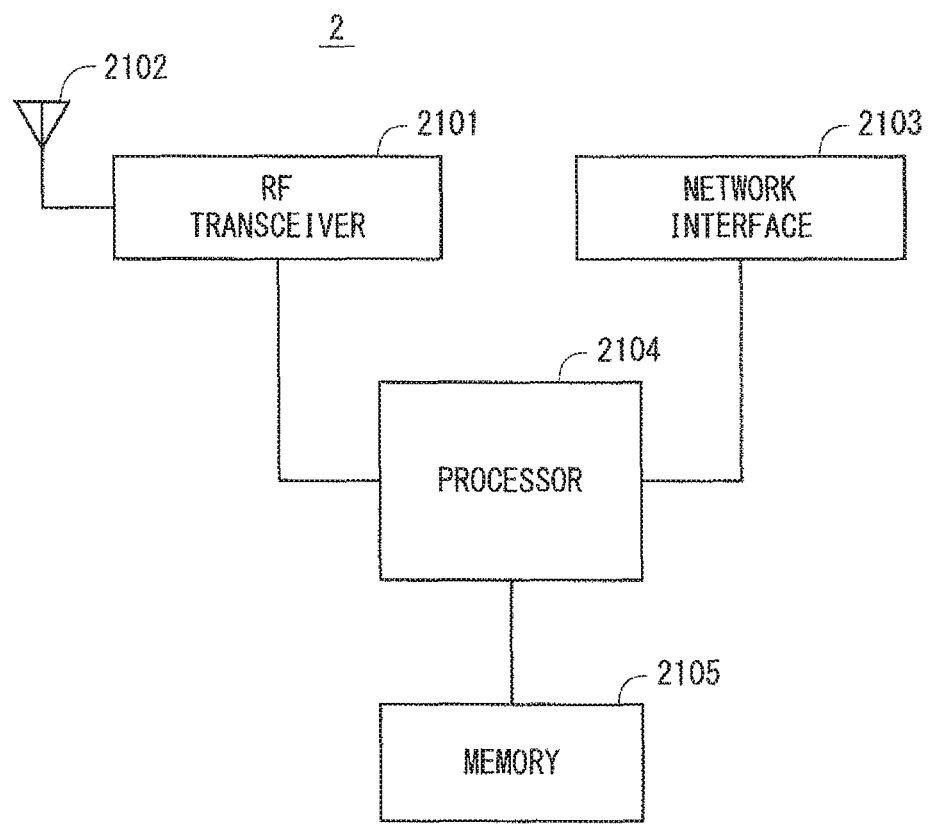
FIG. 21 is a block diagram illustrating a configuration example of an eNB according to some embodiments.

FIG. 21 is a block diagram illustrating a configuration example of the eNB 2 according to the embodiments described above. With reference to FIG. 21, the eNB 2 includes an RF transceiver 2101, a network interface 2103, a processor 2104, and a memory 2105. The RF transceiver 2101 performs analog RF signal processing to communicate with the UE 1. The RF transceiver 2101 may include a plurality of transceivers. The RF transceiver 2101 is coupled to an antenna 2102 and the processor 2104. The RF transceiver 2101 receives modulated symbol data (or OFDM symbol data) from the processor 2104, generates a transmission RF signal, and supplies the transmission RF signal to the antenna 2102. In addition, the RF transceiver 2101 generates a baseband reception signal based on a reception RF signal received by the antenna 2102 and supplies the baseband reception signal to the processor 2104.

The network interface 2103 is used to communicate with a network node(s) (e.g., mobility management entity (MME) and serving gateway (S-GW)). The network interface 2103 may include, for example, a network interface card (NIC) conforming to the IEEE 802.3 series.

The processor 2104 performs digital baseband signal processing (i.e., data plane processing) and control plane processing for wireless communication. For example, in the case of LTE and LTE-Advanced, the digital baseband signal processing performed by the baseband processor 2104 may include signal processing of the PDCP layer, the RLC layer, the MAC layer, and the PHY layer. In addition, the control plane processing performed by the baseband processor 2104 may include processing of the Si protocol, the RRC protocol, and the MAC CEs.

The processor 2104 may include a plurality of processors. The processor 2104 may include, for example, a modem processor (e.g., DSP) that performs the digital baseband signal processing and a protocol stack processor (e.g., CPU or MPU) that performs the control plane processing.

The memory 2105 is composed of a combination of a volatile memory and a non-volatile memory. The volatile memory is, for example, an SRAM, a DRAM, or a combination thereof. The non-volatile memory is, for example, an MROM, a PROM, a flash memory, a hard disk drive, or any combination thereof. The memory 2105 may include a storage disposed separately from the processor 2104. In this case, the processor 2104 may access the memory 2105 via the network interface 2103 or an I/O interface (not illustrated).

The memory 2105 may store a software module(s) (computer program(s)) including instructions and data for performing the processing of the eNB 2 described in the embodiments described above. In some implementations, the processor 2104 may be configured to load this software module(s) from the memory 2105 and execute the loaded software module(s), thereby performing the processing of the eNB 2 described in the aforementioned embodiments.

As described with reference to FIG. 20 and FIG. 21, each of the processors included in the UE 1 and the eNB 2 according to the embodiments described above executes one or more programs that include instructions for causing a computer to execute the algorithms described with reference to the drawings. These programs can be stored and provided to a computer by using a variety of types of non-transitory computer-readable media. The non-transitory computer-readable media include a variety of types of tangible storage media. Examples of the non-transitory computer-readable media include a magnetic storage medium (e.g., flexible disk, magnetic tape, hard disk drive), an optical magnetic storage medium (e.g., magneto-optical disk), a compact disc read-only memory (CD-ROM), a CD-R, a CD-R/W, and a semiconductor memory (e.g., mask ROM, programmable ROM (PROM), erasable PROM (EPROM), flash ROM, random-access memory (RAM)). In addition, the programs may be supplied to a computer in the form of a variety of types of transitory computer-readable media. Examples of the transitory computer-readable media include an electric signal, an optical signal, and an electromagnetic wave. A transitory computer-readable medium can provide the programs to a computer via a wired communication line, such as an electric wire and an optical fiber, or via a wireless communication line.

Other Embodiments

The embodiments described above may be implemented individually or in any combination.

In the embodiments described above, different spreading code sequences may be applied in a first slot and a second slot within a single subframe.

In the embodiments described above, the cell (CC) in which a PUCCH is transmitted is not limited to a primary cell (PCell) (i.e., primary component carrier (PCC)) in carrier aggregation. For example, the embodiments may be modified such that a PUCCH is configured in any SCell and HARQ ACK/NACK regarding DL transmission on a plurality of SCells is transmitted on the PUCCH of the aforementioned SCell.

The embodiments described above may be applied to carrier aggregation of a master cell group (MCG) in dual connectivity or may be applied to carrier aggregation of a secondary cell group (SCG) in dual connectivity. In the case of the carrier aggregation of a secondary cell group (SCG), the PCell (PCC) of the carrier aggregation may be considered to correspond to a primary SCell (PSCell). The PSCell is a special SCell in the SCG provided by a secondary eNB (SeNB). The PSCell is configured with a PUCCH and is never deactivated, and a RACH procedure is required for the initial configuration of the PSCell.

The method described in the third embodiment, which includes adjusting the transmission power of a PUCCH in a subframe depending on whether a sounding reference signal (SRS) is transmitted in the subframe, may be implemented independently from the improvement of the PUCCH format (i.e., the change in the spreading rate depending on the number of CCs) described in the first and second embodiments. For example, the method may be applied to the transmission using the existing PUCCH formats 1a/1b and 3.

In other words, in some implementations, a wireless terminal includes:

a wireless transceiver configured to wirelessly communicate with a base station; and at least one processor coupled to the wireless transceiver, in which the at least one processor is configured, when at least one hybrid automatic repeat request (HARQ) ACK/NACK bit corresponding to at least one downlink component carrier (DL CC) configured in the wireless terminal is transmitted on a single physical uplink control channel (PUCCH) on a single uplink component carrier (UL CC), to adjust transmission power of the PUCCH depending on whether a sounding reference signal (SRS) is transmitted in a slot in which the PUCCH is transmitted.

Furthermore, the adjustment of the transmission power of the PUCCH may be performed by adding a first offset to the transmission power of the PUCCH when the SRS is transmitted in the slot in which the PUCCH is transmitted. In this case, the at least one processor may be configured to receive a signaling message indicating the first offset from the base station.

In the transmission of the exiting PUCCH formats 1a/1b and 3, the last PUCCH symbol arranged in the last SC-FDMA symbol in the second slot is punctured for the shortened PUCCH transmission. In other words, the spreading rate applied to the transmission of HARQ ACK/NACK modulation symbols in the slot in which an SRS is transmitted is smaller than the spreading rate in the slot in which an SRS is not transmitted. Accordingly, the spreading gain of the PUCCH in the slot in which an SRS is transmitted is smaller than the spreading gain in the slot in which an SRS is not transmitted. The decrease in the spreading gain at the time of the shortened PUCCH transmission can be compensated by using the method of adjusting the PUCCH transmission power, which is described in the third embodiment, in the transmission schemes of the exiting PUCCH formats 1a/1b and 3.

Furthermore, the embodiments described above are merely examples pertaining to the applications of technical ideas obtained by the present inventor. It is needless to say that these technical ideas are not limited to the embodiments described above and various modifications can be made thereto.

REFERENCE SIGNS LIST

1 WIRELESS TERMINAL
2 RADIO BASE STATION
2001 RADIO FREQUENCY (RF) TRANSCEIVER
2003 BASEBAND PROCESSOR
2101 RF TRANSCEIVER
2104 PROCESSOR

The invention claimed is:

1. A wireless terminal comprising:
a wireless transceiver configured to wirelessly communicate with a base station; and
at least one processor coupled to the wireless transceiver, wherein
the at least one processor is configured, when a plurality of hybrid automatic repeat request (HARQ) ACK/NACK bits corresponding to a plurality of downlink component carriers (DL CCs) configured in the wireless terminal are transmitted on a single physical uplink control channel (PUCCH) on a single uplink component carrier (UL CC), to change, depending on the number of the plurality of DL CCs or the number of the plurality of HARQ ACK/NACK bits, a spreading rate to be applied to time-domain spreading of a plurality of modulation symbols generated from the plurality of HARQ ACK/NACK bits, wherein
the at least one processor is configured to selectively perform a plurality of time-domain spreading operations including first and second time-domain spreading operations to change the spreading rate, depending on the number of the plurality of DL CCs or the number of the plurality of HARQ ACK/NACK bits,
the first time-domain spreading operation includes performing time-domain spreading on a single data block at a spreading rate of 2n (n is an integer) by using a first length-2n spreading code sequence, wherein the single data block is to be mapped to predetermined 2n single-carrier FDMA (SC-FDMA) symbols within a single slot in accordance with a PUCCH format used to transmit the plurality of HARQ ACK/NACK bits, and
the second time-domain spreading operation includes preforming time-domain spreading on two data blocks at a spreading rate of n by using a second length-n spreading code sequence consisting of n elements of the first spreading code sequence and a third length-n spreading code sequence consisting of the remaining n elements of the first spreading code sequence, wherein the two data blocks is to be mapped to the predetermined 2n SC-FDMA symbols within the single slot in accordance with the PUCCH format.

2. The wireless terminal according to claim 1, wherein
the plurality of time-domain spreading operations further includes a third time-domain spreading operation, wherein
the third time-domain spreading operation includes performing time-domain spreading on 2n data blocks at a spreading rate of 1 by using 2n length-1 spreading code sequences each consisting of a respective one of the 2n elements of the first spreading code sequence, wherein the 2n data blocks is to be mapped to the predetermined 2n SC-FDMA symbols within the single slot in accordance with the PUCCH format.

3. The wireless terminal according to claim 2, wherein the first spreading code sequence is orthogonal to a fourth length-2n spreading code sequence used by another wireless terminal,
the second spreading code sequence is orthogonal to a spreading code sequence consisting of corresponding n elements of the fourth spreading code sequence, and
the third spreading code sequence is orthogonal to a spreading code sequence consisting of remaining n elements of the fourth spreading code sequence.

4. The wireless terminal according to claim 1, wherein the predetermined 2n SC-FDMA symbols do not include a last SC-FDMA symbol within the slot.

5. The wireless terminal according to claim 4, wherein the last SC-FDMA symbol is used to transmit a reference signal (RS) symbol.

6. The wireless terminal according to claim 1, wherein the at least one processor is configured to receive, from the base station, signaling explicitly or implicitly indicating the spreading rate.

7. The wireless terminal according to claim 6, wherein the implicit indication of the spreading rate is performed by configuring one or more secondary component carriers in the wireless terminal.

8. The wireless terminal according to claim 1, wherein the at least one processor is configured to adjust transmission power of the PUCCH depending on whether a sounding reference signal (SRS) is transmitted in a slot in which the PUCCH is transmitted, wherein
the adjustment of the transmission power of the PUCCH is performed by adding a first offset to the transmission power of the PUCCH when the SRS is transmitted in the slot in which the PUCCH is transmitted, and
the at least one processor is configured to receive signaling indicating the first offset from the base station.

9. The wireless terminal according to claim 8, wherein the first offset is indicated per spreading rate.

10. The wireless terminal according to claim 1, wherein the at least one processor is configured to adjust transmission power of the PUCCH depending on the spreading rate.

11. The wireless terminal according to claim 10, wherein the adjustment of the transmission power of the PUCCH depending on the spreading rate is performed by adding a second offset corresponding to the spreading rate to the transmission power of the PUCCH, and
the at least one processor is configured to receive signaling indicating the second offset from the base station.

12. The wireless terminal according to claim 1, wherein the first spreading code sequence is orthogonal to a fourth length-2n spreading code sequence used by another wireless terminal, and
the second spreading code sequence is orthogonal to a spreading code sequence consisting of corresponding n elements of the fourth spreading code sequence.

13. A method in a wireless terminal, the method comprising:
when a plurality of hybrid automatic repeat request (HARQ) ACK/NACK bits corresponding to a plurality of downlink component carriers (DL CCs) configured in the wireless terminal are transmitted on a single physical uplink control channel (PUCCH) on a single uplink component carrier (UL CC), changing, depending on the number of the plurality of DL CCs or the number of the plurality of HARQ ACK/NACK bits, a spreading rate to be applied to time-domain spreading of a plurality of modulation symbols generated from the plurality of HARQ ACK/NACK bits, wherein
the changing includes selectively perform a plurality of time-domain spreading operations including first and second time-domain spreading operations to change the spreading rate, depending on the number of the plurality of DL CCs or the number of the plurality of HARQ ACK/NACK bits,
the first time-domain spreading operation includes performing time-domain spreading on a single data block at a spreading rate of 2n (n is an integer) by using a first length-2n spreading code sequence, wherein the single data block is to be mapped to predetermined 2n single-carrier FDMA (SC-FDMA) symbols within a single slot in accordance with a PUCCH format used to transmit the plurality of HARQ ACK/NACK bits, and
the second time-domain spreading operation includes preforming time-domain spreading on two data blocks at a spreading rate of n by using a second length-n spreading code sequence consisting of n elements of the first spreading code sequence and a third length-n spreading code sequence consisting of the remaining n elements of the first spreading code sequence, wherein the two data blocks is to be mapped to the predetermined 2n SC-FDMA symbols within the single slot in accordance with the PUCCH format.

14. A base station, comprising:
a wireless transceiver configured to wirelessly communicate with a wireless terminal; and
at least one processor coupled to the wireless transceiver, wherein
the at least one processor is configured to receive, from the wireless terminal, a physical uplink control channel (PUCCH) transmitted in accordance with a PUCCH format, and
the PUCCH format enables the wireless terminal, when a plurality of hybrid automatic repeat request (HARQ) ACK/NACK bits corresponding to a plurality of downlink component carriers (DL CCs) configured in the wireless terminal are transmitted on a single physical uplink control channel (PUCCH) on a single uplink component carrier (UL CC), to change a spreading rate to be applied to time-domain spreading of a plurality of modulation symbols generated from the plurality of HARQ ACK/NACK bits, depending on the number of the plurality of DL CCs or the number of the plurality of HARQ ACK/NACK bits, wherein
the changing of the spreading rate includes selectively perform a plurality of time-domain spreading operations including first and second time-domain spreading operations to change the spreading rate, depending on the number of the plurality of DL CCs or the number of the plurality of HARQ ACK/NACK bits,
the first time-domain spreading operation includes performing time-domain spreading on a single data block at a spreading rate of 2n (n is an integer) by using a first length-2n spreading code sequence, wherein the single data block is to be mapped to predetermined 2n single-carder FDMA (SC-FDMA) symbols within a single slot in accordance with a PUCCH format used to transmit the plurality of HARQ ACK/NACK bits, and
the second time-domain spreading operation includes performing time-domain spreading on two data blocks at a spreading rate of n by using a second length-n spreading code sequence consisting of n elements of the first spreading code sequence and a third length-n spreading code sequence consisting of the remaining n elements of the first spreading code sequence, wherein the two data blocks is to be mapped to the predetermined 2n SC-FDMA symbols within the single slot in accordance with the PUCCH format.

15. The base station according to claim 14, wherein
the plurality of time-domain spreading operations further includes a third time-domain spreading operation, wherein
the third time-domain spreading operation includes performing time-domain spreading on 2n data blocks at a spreading rate of 1 by using 2n length-1 spreading code sequences each consisting of a respective one of the 2n elements of the first spreading code sequence, wherein the 2n data blocks is to be mapped to the predetermined 2n SC-FDMA symbols within the single slot in accordance with the PUCCH format.

16. The base station according to claim 14, wherein
the first spreading code sequence is orthogonal to a fourth length-2n spreading code sequence used by another wireless terminal, and
the second spreading code sequence is orthogonal to a spreading code sequence consisting of corresponding n elements of the fourth spreading code sequence.

17. The base station according to claim 14, wherein the at least one processor is configured to transmit, to the wireless terminal, signaling explicitly or implicitly indicating the spreading rate.

18. The base station according to claim 14, wherein
the at least one processor is configured to transmit signaling indicating a first offset to the wireless terminal, and
the first offset enables the wireless terminal to adjust transmission power of the PUCCH depending on whether a sounding reference signal (SRS) is transmitted in a slot in which the PUCCH is transmitted.

19. The base station according to claim 18, wherein the first offset is indicated per spreading rate.

20. The base station according to claim 14, wherein
the at least one processor is configured to transmit signaling indicating a second offset to the wireless terminal, and
the second offset enables the wireless terminal to adjust transmission power of the PUCCH depending on the spreading rate.

* * * * *

UNITED STATES PATENT AND TRADEMARK OFFICE
CERTIFICATE OF CORRECTION

PATENT NO. : 10,374,748 B2  
APPLICATION NO. : 15/571200  
DATED : August 6, 2019  
INVENTOR(S) : Kengo Oketani Page 1 of 1

It is certified that error appears in the above-identified patent and that said Letters Patent is hereby corrected as shown below:

In the Specification

Column 2, Line 20; Delete "($N^{DL}_{RB}$)" and insert --($N^{UL}_{RB}$)-- therefor Column 15, Line 66; Delete "RS s" and insert --RSs-- therefor Column 20, Line 12; Delete "Si" and insert --S1-- therefor In the Claims Column 22, Line 49; In Claim 1, delete "preforming" and insert --performing-- therefor Column 24, Line 18; In Claim 13, delete "preforming" and insert --performing-- therefor Column 24, Lines 58-59; In Claim 14, delete "single-carder" and insert --single-carrier-- therefor Signed and Sealed this
Fourteenth Day of January, 2020

Andrei Iancu
*Director of the United States Patent and Trademark Office*